US010455362B1

(12) United States Patent
Meissner et al.

(10) Patent No.: US 10,455,362 B1
(45) Date of Patent: *Oct. 22, 2019

(54) CONTEXTUAL PRESENCE

(71) Applicant: Amazon Technologies, Inc., Seattle, WA (US)

(72) Inventors: Eric Meissner, Seattle, WA (US); Alexander Say Go, Sammamish, WA (US); Chinmay Milind Dani, Seattle, WA (US); Samuel Scott Gigliotti, Seattle, WA (US); Benjamin Markwardt, Seattle, WA (US); Tejas Patel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 169 days.

This patent is subject to a terminal disclaimer.

(21) Appl. No.: 15/395,816

(22) Filed: Dec. 30, 2016

(51) Int. Cl.
  *H04W 24/00* (2009.01)
  *H04W 4/029* (2018.01)
  *H04L 29/08* (2006.01)
  *H04W 68/00* (2009.01)
  *H04W 4/60* (2018.01)

(52) U.S. Cl.
  CPC .......... *H04W 4/029* (2018.02); *H04L 67/306* (2013.01); *H04W 68/005* (2013.01); *H04W 4/60* (2018.02)

(58) Field of Classification Search
  CPC ....... H04L 29/08657; H04L 29/08936; H04W 4/02; H04W 4/029; H04W 64/00
  See application file for complete search history.

(56) References Cited

U.S. PATENT DOCUMENTS

| 2008/0025307 A1* | 1/2008 | Preiss | H04L 67/26 370/392 |
| 2008/0243609 A1* | 10/2008 | Murto | G06Q 30/0242 705/14.41 |
| 2011/0167153 A1* | 7/2011 | Maes | G06F 17/30908 709/224 |
| 2013/0002805 A1* | 1/2013 | Andresen | H04N 7/147 348/14.07 |

OTHER PUBLICATIONS

Office Action for U.S. Appl. No. 15/395,759, dated Apr. 16, 2019, Meissner, "Contextual Presence", 9 pages.

* cited by examiner

*Primary Examiner* — Shantell L Heiber
(74) *Attorney, Agent, or Firm* — Lee & Hayes, P.C.

(57) ABSTRACT

This disclosure is directed to generating one or more presence-event notifications at one or more user devices associated with a user, and transmitting those presence-event notifications to one or more presence server(s). At the presence server(s) a stream of presence-event notifications may be filtered according to any number of predefined criteria, and then the presence-event notifications that have filtered through may be applied to presence plug-ins to generate presence information associated with user(s) for whom presence-event notifications were received. The presence-event notifications may be provided as a stream of presence information to one or more consumers of presence information and/or stored in a presence datastore. A consumer of presence information, such as a service provider, may request presence information associated with one or more users. In response, the service provider may be provided with the requested presence information based on whether that service provider has permissions to receive the requested presence information.

20 Claims, 16 Drawing Sheets

CONTEXTUAL PRESENCE

BACKGROUND

Service providers are increasingly offering new and different services to customers. In some instances, these service providers provide these services when users are present and/or available to receive such services. In some cases, the service providers may be unable to provide services to customers who are not present and/or available to accept such services.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
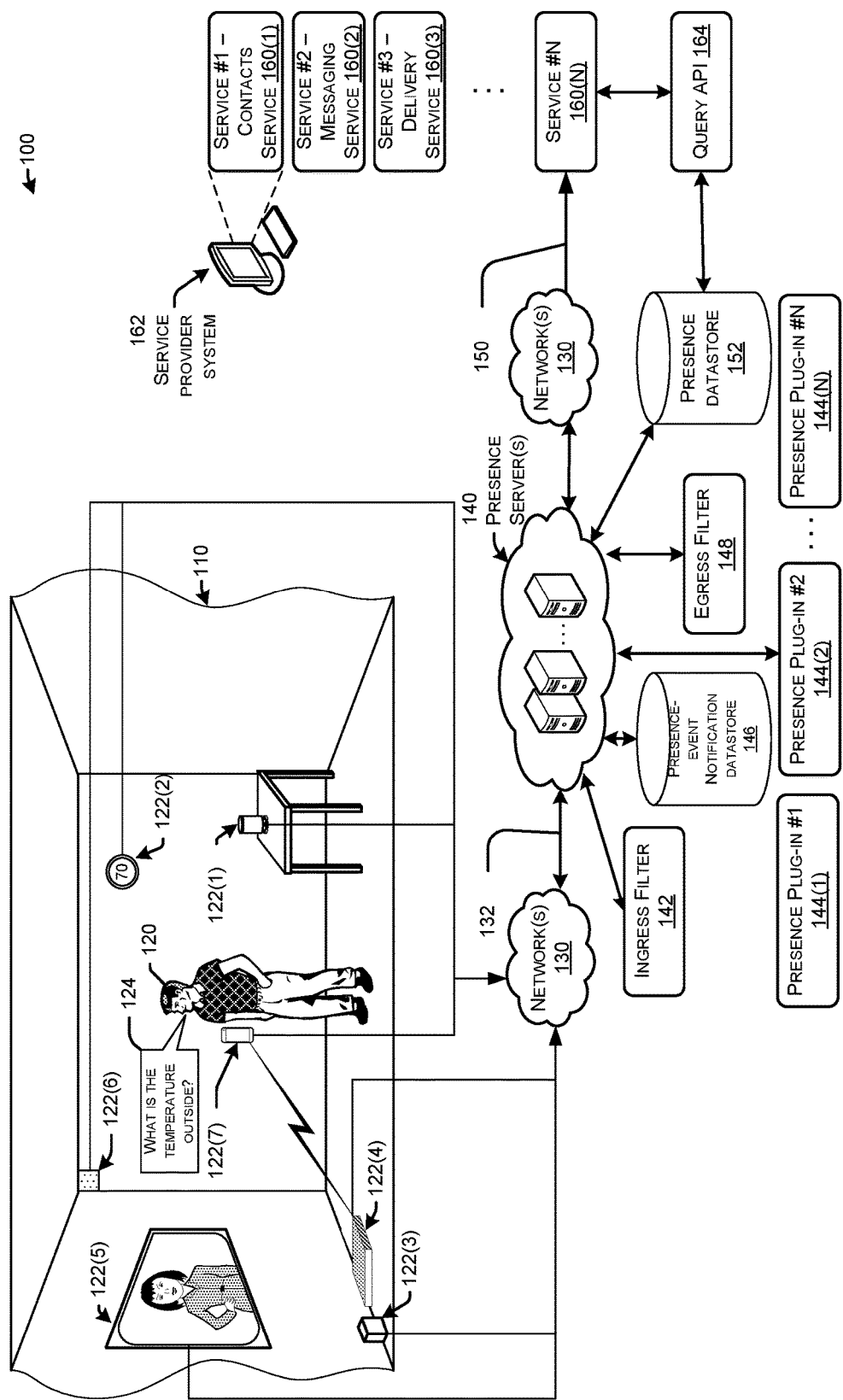
FIG. 1 illustrates a schematic diagram of an example environment with a variety of user devices that provide presence-event notifications to one or more presence server(s), which, in turn, provide presence information to one or more service(s).

Example embodiments of this disclosure describe methods, apparatuses, computer-readable media, and systems for receiving notifications of presence events from one or more user device(s) associated with a user or a group of users. The presence events may be any type of event that gives an indication that a particular user may be in a particular predefined location (e.g., home, office, car, etc.) and/or are available to receive a service. The collection of any presence-based information may occur with explicit consent of each user, such as in response to each user affirmatively requesting to participate in a presence-based service.

Presence events may be generated by any variety of user device(s) that may interact with a particular user or group of user(s). Such presence event(s) may be generated based at least in part on an interaction between the user and a user device, or an interaction between two or more user devices. In some example embodiments, interaction event data representative of an event may be generated by a user device based on a user interacting with his/her user device. For example, if a user speaks a wake word and/or asks a question to his/her voice-controlled device that is known to be associated with a particular location, then the voice-controlled device may register an interaction event that is indicative of the user's location at a particular place (e.g., home, office, car, etc.) where the user device that registered the interaction event is located. As another example, if a person's smartphone connects with a particular Wi-Fi access point (AP), then a presence event may be generated by the smartphone and/or the AP. As yet another example, if a smart lock on a door to a person's house is activated (e.g., unlocked), then the unlocking action may be used as the basis for generating presence event data. Further example user device(s) and/or activities that may cause the generation of presence event(s) include interactions with: smart appliances (e.g., opening/closing a refrigerator door or stove door), a desktop or laptop computer, global satellite navigation system (e.g., global positioning satellite (GPS) system), smart motion sensors, home monitoring and other types of cameras, and/or smart thermostats. Additionally, any variety of biometric mechanisms may be employed for generating presence events, such as facial recognition, automatic speech recognition (ASR), fingerprint recognition, or any other type of biometric identification. Indeed, any suitable action or function associated with a user and performed by a user device may generate presence-event notification data. Such actions may be active interactions with a user, passive detection of the user, and/or pre-programmed actions or functions performed with one or more other user devices. The device(s) and/or mechanisms discussed here are by example only, and are not intended to be limiting or exhaustive in nature.

Once a user device generates a presence event, it may send an indication of the presence event, or a presence-event notification, to one or more presence server(s). The presence server(s) may receive presence-event notification(s) generated by not only user devices associated with a particular user and/or a group of users, but also from a plurality of other user device(s) and/or group of user device(s). In some cases, the presence-event notifications may be tagged (e.g., metadata, message attachments, etc.) with a user identification associated with one or more users (e.g., an individual, a family, a household, any combination of roommates, etc.). In other cases, the presence-event notifications may not be tagged with a user identification, but may instead be tagged with a reporting user device that may be associated with a particular user identification, group of user identifications, a user, and/or a group of users. In some cases, a particular user device may be associated with more than one user and/or user identifications. For example, a smart microwave oven that may detect, generate, and transmit a presence-event notification upon user interaction (e.g., opening/closing the microwave oven door), may report such an interaction event as an interaction event notification associated with a husband's user identification, a wife's user identification, and/or any number of children's user identifications, within a household. Alternatively, or in addition, the whole family may have a single user identification that may be tagged to any presence-event notifications produced by the smart microwave oven. In embodiments where a user identification may not be provided with presence-event notification(s) a user and/or user identification may be identified by the recipient of the presence-event notification(s) based on a variety of other information, such as a user device that transmits such a presence event.

In example embodiments, in addition to a presence event notification including information pertaining to an identification(s) of a user, a group of users, and/or user device(s), there may be any number of additional suitable information. For example, such information may include indications of what kind of activity the user may be engaged in with the user device that detects the presence event. For example, if a user is watching a particular movie on a smart TV, the smart TV may include the title of the movie that that is being watched by the user and/or group of users. This type of presence event notifications may not only be used to derive information such as presence at a particular location and/or availability, but also a propensity of a user or a group of users to engage in a particular activity. For example, if a user is watching a particular movie, that user may be more likely to purchase a soundtrack of that movie than someone who never watched it.

In some example embodiments, a remote server may generate presence event notifications associated with a particular user. For example, a user logging into a social media account, an email account, or indeed any type of login and/or user identifying event may be used by a service and/or remote server to generate a presence event notification. As another example, when a particular website is accessed from a particular user device, the website may be configured to identify the user device and generate a presence event notification that indicates the user device has accessed the website, along with any other suitable information (e.g., user identification, user activity, etc.).

The presence-event notifications may be transmitted by user devices to one or more presence server(s) via one or more networks (e.g., the Internet, etc.). When the presence server(s) receive a stream of presence-event notifications from a number of different user device(s) associated with a number of different users, the presence server(s) may partition the presence events into individual presence-event notifications and ascribe a user identification to each of the presence events. In some cases, the presence events may be tagged with a user identification. In other cases, the presence server(s) may associate a user identification to a received presence event based at least in part on a signature or identification of a user device from which the presence event is received. In other words, the presence server(s), in some example embodiments, may have a mapping (e.g., a look-up table, etc.) for associating an incoming presence event to a particular user and/or user identification.

The presence events received by the presence server(s) may be applied to an ingress filter. The ingress filter may define a number of ingress filter parameters by which to filter the incoming stream of presence-event notifications, and discard some of the incoming presence-event notifications according to one or more criteria that are encoded in the ingress filter parameters. Presence-event notifications may be filtered by any variety of criteria, such as the type of the presence event, the users to which they pertain, the age of the users, the geography of the user, user-defined criteria, combinations thereof, or the like. In some example embodiments, the ingress filter parameters may be universal across some or all users for whom presence-event notifications are received. In other example embodiments, the ingress filter parameters may be specific to each user or group of users. In other words, according to some example embodiments, individual users may have different criteria by which their presence-event notifications are filtered. In yet further example embodiments, the one or more filtering criteria for the ingress filter parameters may be user-selectable. Thus, in these example embodiments, the user may be able to select which types of presence events, as reported by his/her user device(s) to the one or more presence server(s), are to be discarded. For example, a user may instruct, as parametrized in the ingress filter parameters, that any of his/her work-related user devices providing presence-event notifications during work hours are not to be used to determine, report, and/or track the user's location and/or availability. In this case, suppose the user's work laptop computer triggers and provides a presence-event notification based upon the user logging into the work laptop computer during work hours, then this presence-event notification may be filtered out by the ingress filter at the presence server(s) and may not be used for generating any type of presence information about the user at the presence server(s).

In some example embodiments, incoming presence-event notifications that have not been filtered out by the ingress filtering process may be stored in any suitable presence-event archive, such as a presence-event notification datastore. The filtered presence-event notifications may be archived permanently or for any predetermined period of time.

If the presence server(s) receive a presence-event notification that has not been filtered out by the ingress filtering, the presence server(s) may ascribe a user to the notification, such as by identifying an associated user identification, user account, and/or user profile associated with the received presence-event notification. According to example embodiments, the presence server(s) may apply the presence event notification to one or more presence plug-ins. The presence plug-ins may have one or more presence models that generate presence information. The presence information may provide any suitable variety of indications, such as if a user or a group of users are in a particular location, if a user or a group of users are available to receive a service, and/or a likelihood that a user or group of users are to engage in an activity. For example, presence information may indicate if a particular user is in his/her home to accept a physical delivery. As another example, the presence information may be indicative of a person's availability to accept a call or receive a message on his/her user device. As yet another example, the presence information may be indicative of a person's propensity to engage in an activity, such as purchase a service or product, or view an advertisement. As a non-limiting example, consider a previous example where a presence-event notification indicated that a user is watching a particular movie. When this presence-event notification is applied to a presence plug-in, the presence plug-in may generate presence information that indicates that the user has a 60% likelihood of purchasing a soundtrack of the particular movie.

These presence models, in some example embodiments, may provide a binary indication of whether a user associated with the presence event is at a particular location, is available for receiving a service, and/or is likely to engage in a particular activity. Thus, in these example embodiments, the presence models may indicate a yes or no, or possibly unknown, answer to the question of whether the user is present at a particular location, is available, and/or will engage in an activity. In other example embodiments, the presence models of the plug-ins may generate presence information that includes a probability and/or a confidence level of the user being at a particular location, being available, and/or engaging in an activity. For example, the plug-in may report that the probability of the user being at his/her home is 85%. As a result, a consumer of the presence information, such as a service provider, may be able to use the probability, such as by comparing the probability to a threshold level, to determine if they wish to dispatch a service. As another example, another plug-in may report that the probability of the user visiting a particular amusement park may be 40%. The operators of the amusement park may use this information to determine if they wish to advertise to this user and/or provide incentives and/or coupons to the user to increase his/her probability of visiting the amusement park.

The presence model(s) may be any suitable types of predictive model(s), probabilistic distribution(s), statistical model(s), analytical equation(s), linear or non-linear mapping(s), or indeed any type of predictive mechanism(s) that may relate an incoming presence-event notification, or a group of presence-event notifications, to a prediction of the user's and/or group of users' presence at a particular location, availability, and/or propensity to engage in an activity (e.g., purchase, subscribe, view, visit, call, etc.). Such models may include, for example, direct mapping, machine learning models, regression models, neural network models, any variety of statistical models, combinations thereof, or the like. The presence models, as embodied in the plug-ins may take into account various confidence levels of user detection associated with different types of presence events. For example, a user interaction where the user speaks a wake word to his/her home voice-controlled device may result in a relatively high confidence level of the user being at home. A presence model, as embodied in one or more plug-ins may use this presence-event notification to ascribe, for example, a confidence of 100% that the user is at home. On the other hand, tripping a motion sensor at the user's home, particularly if the owner has a pet that can trip the motion sensor, may generate a presence-event notification that may be considered a less reliable indicator of the user being at home than the presence-event notification associated with the voice-controlled device. In this case, a presence model, as embodied in one or more plug-ins may use this presence-event notification from the motion sensor to ascribe, for example, a confidence of 30% that the user is at home. In example embodiments, the plug-ins may be configured to utilize more than one presence-event notification to predict the presence of a user at a particular location and/or being available for a service. For example, if a user device that is normally, but not always, carried by the user is connected to the user home Wi-Fi, then that may generate a confidence level, by itself, of 75% that the user is at home. However, if that presence-event notification is considered by the plug-ins in addition to the prior example presence-event notification from the motion detector, then the plug-ins and the presence models embodied therein may determine a higher probability, such as 95%, that the user is at home.

In example embodiments, the presence model(s) may consider more than one presence-event notification associated with a particular user and/or group of users to generate presence information. For example, the presence model(s) may access the datastore of post-ingress filtered presence-event notifications associated with a particular user or group of users to generate one or more presence information. In fact, different presence models may use different numbers and/or different types of presence-event notifications to generate presence information. The presence model(s) may consider contextual information (e.g., what is the user doing, what is the user asking for, what is the user listening to, what is the user reading, etc.), as provided in example presence event notifications, to generate presence information.

In some example embodiments, the presence model(s) and/or the presence plug-in(s) within which the presence model(s) are embodied, may themselves generate presence-event notifications and/or other notifications that may be consumed by other plug-ins to generate presence information. As an example, a first plug-in may generate information about a particular user that may be used by a second and a third plug-in to generate presence information about that user. As another example, a first plug-in may determine that a particular user is in proximity to his/her smartphone on which he/she typically purchases music. A second plug-in may determine that the particular user is listening to a particular artist's music on another of the user's user devices. A third plug-in may be able to take the information generated by both the first plug-in and the second plug-in to generate presence information that may indicate a probability of the user purchasing a new music track released by the particular artist. A particular presence model and/or presence plug-in may use any suitable number and/or combination of presence-event notifications from user devices (e.g., indicating user interaction with the user devices and/or between user devices, etc.), from other service servers (e.g., indicating user login to a social network site or service provider site, user making a purchase on retail website, etc.), and/or from other plug-ins, as described above.

When the presence server(s) generate presence information, the presence server(s), in example embodiments, may tag the presence information with some type of identifier (e.g., a user identification, login, etc.) of the user to which that presence information pertains. Thus, the presence information may include a binary indicator (e.g., available or not available), a probabilistic indicator, and/or an indicator of the user to which the presence information pertains. The presence server(s), in example embodiments, may stream out the presence information to a variety of service provider that are authorized to receive that presence information via a corresponding service provider system. Alternatively, or additionally, the presence server(s) may store the presence information, associated with the user (e.g., by user identification), in a presence datastore. The presence datastore, in some example embodiments, may be accessible to retrieve, such as by using a reference to a corresponding user identification, presence information pertaining to a user. Such a retrieval may be performed, in example embodiments, responsive to a request for presence information, such as from a service provider.

In some example embodiments, if the presence server(s) generate more than one presence information pertaining to a particular user, those presence information elements may be aggregated into a single file and/or document before publishing (e.g., streaming and/or storing in the presence datastore). More than one presence information may be generated if a single or multiple filtered presence-event notification(s) result in the generation of multiple presence information, such as from a single plug-in or from different plug-ins. For example, if a particular plug-in determines, based at least in part on a presence-event notification, that there is a 100% probability of the user being at home, another plug-in may determine, such as based in part on the same presence-event notification, that the user has a 0% probability of being in his/her office. Yet another plug-in, based at least in part on the same presence-event notification, may determine that there is a 5% probability of the user being in his/her car. In other example embodiments, multiple presence information may be generated for a particular user based at least in part on the multiple presence-event notifications, as received by the presence server(s).

In some example embodiments, an egress filter may be implemented to filter presence information, as generated by the presence server(s). Similar to the ingress filter, the egress filter, in example embodiments, may have filtering parameters based on criteria that may be universal, tailored to an individual user, and/or based at least in part on the service provider that may have access to the presence information. For example, a user may request that presence information for him/her not be made available between 11 AM and 6 AM the next day, when he/she anticipates being asleep. This criterion may be encoded in egress filter parameters to prevent the presence server(s) from providing presence information pertaining to this user during the hours indicated by the user.

The level of confidence of presence-event notifications in predicting presence information may decay over time. For example, a presence event that occurred 2 minutes ago may provide a high level of confidence that a particular user is in a particular location. However, that same presence event, may provide a much lower level of confidence if 2 hours of time has passed since the presence event occurred. Therefore, in example embodiments of the disclosure, the presence server(s) may implement a time decay function for presence events that are used for generating presence information that is published (e.g., streamed or stored in the presence datastore). In some example embodiments, the time decay function may decrement a weight of a presence-event notification in providing predictive value within a presence model. For example, a time decay function may be used to diminish the weight and/or predictive value of a received presence-event notification over time within a presence model that uses that presence-event notification. The time decay function may provide a schedule for decreasing the weight of a particular presence-event notification within a presence model. In example embodiments, the time decay function may define a curve (e.g., weight vs. time, etc.) definition, according to which the weight of a particular presence-event notification is to be decayed. In example embodiments, different presence event notifications may be decayed according to different decay functions. The decay functions may continue to perform a decrement in the weight and/or confidence of a presence event in a periodic, or non-periodic, linear, or non-linear fashion, until the weight becomes meaningless, reaches a confidence of 0%, and/or is reset by the receipt of a new presence-event notification of the same and/or similar type associated with the user. As newly revised probability for a user being at a particular location, being available, or engaging in an action is generated, the new probability may be published in a similar fashion as the initial presence information, such as by streaming the new presence information and/or storing the new presence information in the presence datastore.

In alternate example embodiments, the time decay function may decrement a probability of a person being at a particular location, available, and/or his/her propensity to engage in an action over time elapsed from when the presence information was generated. In example embodiments, the time decay function may decrement a probability provided in presence information by a predetermined amount, and after a predetermined time period. It may continue to perform this decrement in a periodic, or non-periodic, linear, or non-linear fashion, until the probability becomes meaningless, reaches a probability of 0%, and/or is reset by the receipt of a new presence-event notification associated with the user. As a newly revised probability for a user being at a particular location, or being available, is generated, the new probability may be published in a similar fashion as the initial presence information, such as by streaming the new presence information and/or storing the new presence information in the presence datastore.

As an example of the time decay function, consider that a person's smartphone connecting to his/her home Wi-Fi is reported as a presence event to the presence server(s), resulting in a 90% initial probability that the user is at home. After 10 minutes the probability may be revised to 85%, and then after another 10 minutes 70%, and then after another 10 minutes 40%, and so on and so forth. In example embodiments, if a new presence information is determined based at least in part on new presence-event notifications, then the presence server(s) may not issue revised probabilities using its time decay functions.

In some example embodiments, the presence servers, instead of publishing updated time decayed presence information, may provide parameters that may allow a consumer of the presence information (e.g., a service provider) to decay the presence information itself. As an example, a function may be provided, along with the presence information, that may be used by a service provider to time decay any probability and/or confidence level according to the function. As another example, a piecewise curve may be provided that to the service provider that indicates a duration and change in the probability and/or confidence level with elapsed time.

The presence information, as generated by the presence server(s), may be available to one or more service providers via their service provider system(s). The service providers, if authorized to do so, may access and/or request the presence information via any suitable service provider system, such as a desktop computer, server, laptop computer, smartphone, or the like. In some example embodiments, the service provider(s) may receive a stream of presence information, as output by the presence server(s). A service provider may monitor the presence information stream to determine if it recognizes any of the user identifications associated with any of the presence information in the stream of presence information. If the service provider finds a presence information for which it is able to identify the corresponding user, such as by his/her user identification, then the service provider may determine if it is to provide any services to that user. If it is not to provide any services to the user, then the service provider may discard the presence information. However, if the service provider is to provide a service to that user, then it may use the presence information, as identified by it as pertaining to the user, to determine if the service is to be provided and/or provided at this time. For example, if the service provider is to deliver perishable goods to a user, and it is necessary for the user to be home to ensure that the deliveries do not perish, then the service provider may dispatch the delivery if it is sufficiently confident, based at least in part on the presence information, that the user is at home.

In some example embodiments, instead of, or in addition to, monitoring a stream of presence information, a service provider may request presence information associated with a particular user to whom services are to be provided. The service provider may generate a request that indicates the user, such as by user identification, for whom presence information is requested. The request may be sent, such as via one or more networks (e.g., the Internet) and/or via a query application program interface (API), to the presence server(s). The presence server(s) may determine, responsive to receiving the request, whether the requesting service provider is authorized to receive the requested presence information. The requested presence information may be provided to the service if the service is indeed authorized to receive the requested presence information. If the service provider is not allowed to receive the requested presence information, then the service provider may be notified, by the presence server(s), that it lacks the authority to receive the requested presence information. As an example, if a particular user specifies that he/she does not want his/her presence information shared with debt collection agencies, then if a debt collection agency attempts to obtain his/her presence information, the presence server(s) may not share the requested presence information with the debt collection service.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram of an example environment 100 with a variety of user devices 122(1), 122(2), 122(3), 122(4), 122(5), 122(6), 122(7) that provide presence-event notifications to one or more presence server(s) 140, that, in turn, provide presence information to one or more service(s) 160(1), 160(2), 160(3), ... 160(N), in accordance with example embodiments of the disclosure.

The example environment 100 may include a location 110, such as a home, work, car, conference room, coffee shop, or any other type of location 110 where a user 120 may be present. The location may have a variety of user devices 122(1), 122(2), 122(3), 122(4), 122(5), 122(6), 122(7) (hereinafter referred to individually or collectively as user device 122) that may interact with each other, or with which the user 120 may interact. These interactions, in some example embodiments, may be deemed potential presence events by one or more of the user devices 122. The user devices 122, upon determining an interaction to be a presence event may generate a presence-event notification and send the presence-event notification via one or more networks 130 to presence server(s) 140.

As an example, the user 120 may speak 124 to a voice-controlled device 122(1). The voice-controlled device 122(1), in addition to other components, may have one or more processors, microphones, speakers, to enable automated speech recognition (ASR) and/or speech synthesis. In some example embodiments, an interaction may be initiated with the voice-controlled device 122(1) by the user 120 uttering a wake word that may be recognized by the voice-controlled device 122(1) to invoke the voice-controlled device 122(1). Regardless of whether a wake word is needed to invoke the voice-controlled device 122(1), an interaction with the user 120 may be recognized as a presence event. As a result, the voice-controlled device 122(1) may generate a presence-event notification, such as an electronic file or data structure that indicates the occurrence of the presence event with the user 120. In some example embodiments, the voice-controlled device 122(1) may further be configured to recognize from the utterance 124 whether the interaction is with user 120, or another person. The presence-event notification, as generated by the voice-controlled device 122(1), may include any one or more of suitable information, such as the type of interaction (e.g., voice interaction, voice not recognized as user 120, voice recognized as user 120, etc.), a user identification (e.g., user identification number, name, user account identification, etc.), a reporting user device identification (e.g., user device identification number, device type—voice-controlled device, etc.), a time stamp, a geo-stamp, and/or any other suitable information. The voice-controlled device 122(1), upon generating the presence-event notification, may transmit the generated presence-event notification to the presence server(s) 140 via the one or more networks 130.

As another example, the user 120 may interact with a thermostat 122(2) (e.g., a smart thermostat) that may recognize the interaction as a presence event, and in response generate a presence-event notification. The thermostat 122(2) may indicate a variety of information in the presence-event notification, such as the type of interaction (e.g., thermostat setting change), a default user identification, a user device identification, timestamp, and/or any other suitable information. The thermostat 122(2), upon generating the presence-event notification, may transmit the generated presence-event notification to the presence server(s) 140 via the one or more networks 130.

As yet another example, the user 120 may interact with a set-top box (STB) 122(3) (e.g., power on, change a channel, invoke a trick play, etc.) or a smart TV 122(5) (e.g., power on, change a channel, launch a content streaming service, etc.) that may recognize the interaction as a presence event, and in response generate a presence-event notification(s). The STB 122(3) and/or smart TV 122(5) may indicate a variety of information in the presence-event notification, such as the type of interaction (e.g., turn on, etc.), a default user identification, a user device identification, timestamp, and/or any other suitable information. The STB 122(3) and/or smart TV 122(5), upon generating the presence-event notification, may transmit the generated presence-event notification to the presence server(s) 140 via the one or more networks 130.

As still another example, the user 120 may trip a motion detector device 122(6) that may identify the motion as a presence event, and in response may generate a presence-event notification. The motion detector device 122(6) may indicate a variety of information in the presence-event notification, such as the type of interaction (e.g., motion detection, etc.), a default user identification, a user device identification, timestamp, and/or any other suitable information. The motion detector device 122(6), upon generating the presence-event notification, may transmit the generated presence-event notification to the presence server(s) 140 via the one or more networks 130.

As another example, the user 120 may carry a smartphone 122(7) or other carried and/or wearable user device that, when carried within radio range of a Wi-Fi or Bluetooth access point (AP) 122(4) may automatically establish a wireless connection therebetween. This action may be recognized by either or both of the smartphone 122(7) and/or the AP 122(4) as a presence event, and in response may generate a presence-event notification. The smartphone 122(7) and/or the AP 122(4) may indicate a variety of information in the presence-event notification(s), such as the type of interaction (e.g., device-to-device, communicative handshaking, etc.), a user identification, a user device identification, a geostamp, timestamp, and/or any other suitable information. The smartphone 122(7) and/or the AP 122(4), upon generating the presence-event notification, may transmit the generated presence-event notification to the presence server(s) 140 via the one or more networks 130. In other example embodiments, the smartphone 122(7) may be configured to generate a presence-event notification based at least in part on other information that may indicate presence and/or availability, such as GPS data, inertial sensor data, touch screen interaction information, and/or indication of voice calls and/or messaging (e.g., text messages, etc.).

Although seven different user devices 122 are depicted in FIG. 1, in example embodiments, there may be any number or type of user devices that may be configured to detect and report presence events. User devices 122 that may be configured to detect a presence event and generate a presence-event notification may include, but is not limited to, televisions, set-top boxes, microphones, speakers, audio systems, imaging devices, computers, computing devices, servers, notebook computers, netbook computers, personal digital assistants (PDAs), smartphones, telephones, tablets, modems, routers, lights, dishwashers, washing machines, coffee machines, refrigerators, door locks, window blinds, thermostats, garage door openers, air-conditioning units, alarm systems, motion sensors, biometric sensors, pressure sensors, radio frequency sensors, ovens, microwaves, navigation systems, in-vehicle infotainment systems (IVIs), combinations thereof, or the like. Indeed, any suitable action performed by a user device may generate presence-event notification data. Such actions may be active interactions with a user, passive detection of the user, and/or pre-programmed actions performed with one or more other user devices. Additionally, in example embodiments, the presence-event notification data may include contextual information about the user and/or an activity in which the user is engaged.

The one or more networks 130 may include any viable communication technology, such as wired and/or wireless modalities and/or technologies. Networks 130 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee®, Bluetooth®, etc.) Wide Area Networks (WANs)—both centralized and/or distributed—and/or any combination, permutation, and/or aggregation thereof.

The presence-event notifications, as generated by the user devices 122, may be received, via the networks 130, by the presence server(s) 140. In some example embodiments, the incoming presence-event notifications may be received as a stream of presence-event notifications. The stream of presence-event notifications may be a series of presence-event notifications that are received from any variety of user devices 122 associated with any number of users 120. In example embodiments, the presence server(s) 140 may receive presence-event notifications associated with any number of different users, and from multiple user device 122, in an asynchronous manner (e.g., the stream). In other words, the presence server(s) 140 may receive the presence-event notifications as they are generated by the various user devices 122 that report the presence events to the presence server(s) 140. The presence server(s) 140 may identify a user associated with each of the presence-event notification(s) that it receives. In some cases, the presence-event notifications themselves may be tagged, such as in metadata, with a user identification. In other cases, the received event notifications may be tagged with user device information that the presence server(s) 140 may be able to associate with one or more users, such as by accessing a table that maps user devices 122 to users 120.

The presence server(s) 140 may apply the incoming presence-event notifications to an ingress filter 142 to filter out presence-event notifications that may not be allowed to be used for generating presence information. In some cases, the ingress filter parameters for filtering out presence events may be user-defined criteria. In other words, the ingress filter 142 may define a number of ingress filter parameters by which to filter the incoming stream of presence events, and discard some of the incoming presence events according to one or more criteria that are encoded in the ingress filter parameters, to generate the filtered stream 132 of presence-event notifications. Presence-event notifications may be filtered by any variety of criteria, such as the type of the presence event, the users to which they pertain, the age of the users, the geography of the user, combinations thereof, user-defined criteria, or the like. In other example embodiments, the ingress filter parameters may be the same across all users for whom presence-event notifications are received by the presence server(s) 140. In other example embodiments, the ingress filter parameters may be specific to particular groups of users, such as users 120 in a particular geographic location, users 120 that purchase a specific service or subscription, etc. As an example, a user may instruct (e.g., parameterize in the ingress filter parameters) that his/her smartphone generated presence-event notifications during the hours of 5 PM to 10 PM may not be used for determining presence information. In this case, any presence-event notifications sent from the user's smartphone 122 to the presence server(s) 140 during the stipulated blocked times may be filtered out by the ingress filter 142.

In some example embodiments, incoming presence-event notifications that have not been filtered out by the ingress filter 142 may be stored in any suitable presence-event archive, such as a presence-event notification datastore 146. The filtered presence-event notifications may be archived permanently or for any predetermined period of time. In some example embodiments, different types of presence-event notifications may be stored for different predetermined times in the presence-event notification datastore 146. Once the presence server(s) 140 receives a presence-event notification that has not been filtered out by the ingress filter 142, the presence server(s) 140 may apply the post-ingress filtered, and retained presence-event notification to one or more presence plug-ins 144(1), 144(2), . . . 144(N) (hereinafter referred to individually or collectively as presence plug-in 144). The presence plug-ins 144 may have one or more presence models that determine presence and/or availability information. In some example embodiments, a particular presence plug-in may determine a user's presence in a particular location, and another plug-in 144 may determine the user's availability at that location. For example, a user 120 may be at home and be on his/her phone. Based on the predictive capabilities of the various plug-ins that may be used, the presence server(s) 140 may correctly identify that the user 120 is at home, but is not available to take another phone call.

As discussed above, in some example embodiments, the presence server(s) 140 may generate presence information, using the available presence plug-ins 144 that are binary in nature (e.g., present or not present), and in other example embodiments, the presence server(s) 140 may generate presence information that may provide a probability and/or confidence level associated with a presence and/or availability prediction (e.g., 80% confidence that Jay is in his car). The presence plug-ins 144 may use any suitable type of predictive modeling, or combinations or predictive models, such as, for example, a regression model and neural network model, for making the presence and/or availability predictions. The presence model(s) may be trained on historical data prior to deployment as part of the one or more presence plug-ins 144.

As discussed above, in example embodiments, the presence model(s) 144, as applied by the presence server(s) 140, may consider more than one presence-event notification associated with a the user 120 and/or group of users to generate presence information. For example, the presence model(s) may access the presence-event notifications datastore 146 associated with the user 120 to generate one or more presence information. Indeed, different presence models may use different numbers and/or different types of presence-event notifications to generate presence information. Additionally, in some example embodiments, the presence model(s) as embodied in the presence plug-ins 144 may consider contextual information, such as the nature of the activities the user is engaged in and/or the state of the user, as may be provided in example presence event notifications, to generate presence information.

In some example embodiments, the presence model(s) and/or the presence plug-in(s) 144 within which the presence model(s) are embodied, may themselves generate presence-event notifications and/or other notifications that may be consumed by other plug-ins 144 to generate presence information. Thus, a particular presence model and/or presence plug-in 144 may use any suitable number and/or combination of presence-event notifications from user device(s) 122, from other service servers, and/or from other plug-ins.

In some example embodiments, an egress filter 148 may be implemented to filter presence information, as generated by the presence server(s) 140. The egress filter 148, in example embodiments, may have egress filtering parameters based on criteria that may be universal, tailored to individual users 120, and/or based at least in part on the service provider that may have access to the presence information. For example, a user 120 may request that presence information for him/her not be made available while he/she is at work. This criterion may be encoded in egress filter parameters to prevent the presence server(s) 140 from providing presence information pertaining to this user 120 during the hours indicated by the user 120.

In some example embodiments, the presence server(s) 140 may tag the presence information with some type of identifier of the user 120 to which that presence information pertains. Thus, the presence information 120 may include a binary indicator, a probabilistic indicator, and/or an indicator of the user to which the presence information pertains. In some example embodiments, the presence information may further have a time stamp, and/or other suitable information. The presence server(s) 140 may stream 150 out the presence information and/or store the presence information, associated with the user, in a presence datastore 152. The presence datastore 152, in some example embodiments, may be accessible to retrieve, such as by using a reference to a corresponding user identification, presence information pertaining to a user 120.

In some example embodiments, the presence server(s) 140 may aggregate presence information pertaining to a common user 120. This may be performed when the presence server(s) 140 generate more than one presence information pertaining to a particular user 120. The presence information pertaining to the particular user 120 may be aggregated into a single file and/or document before streaming 150 and/or storing in the presence datastore 152.

In some example embodiments of the disclosure, the presence server(s) 140 may implement a time decay function for presence events that are published (e.g., streamed 150 or stored in the presence datastore 152). The time decay function may decrement a probability or confidence level of a person being at and/or available at a location as time elapses from the occurrence of the presence event from which the presence information was generated. As newly revised probability for a user being at, or being available, is generated by the presence server(s) 140 by using the time decay function(s), the new probability may be published in a similar fashion as the initial presence information, such as by streaming 150 the new presence information and/or storing the new presence information in the presence datastore 152. As discussed above, in alternate example embodiments, the presence servers 140, instead of publishing updated time decayed presence information, may provide parameters that may allow service provider(s) 160 to decay the presence information. In this case, the presence servers 140 may provide a function, piecewise mapping, and/or any other indication of how a probability level and/or confidence level of presence information is to be decayed with time, along with the presence information itself.

In example embodiments, the one or more service provider(s) 160(1), 160(2), 160(3), . . . , 160(N) may interact with the network(s) 130 and the presence server(s) 140 via a corresponding service provider device 162. Although in the interest of clarity a single service provider device 162 is depicted in FIG. 1, in example embodiments, each service provider may have its own service provider device(s) 162 for interacting with the presence server(s) 140. In example embodiments, the service provider(s) 160, may be configured, via their service provider device(s) 162 to receive the stream 150 of presence information, as published by the presence server(s) 140. In the same or different example embodiments, the service provider(s) 160, may be configured, via their service provider device(s) 162 to access a query application program interface (API) 164 to send a request to the presence server(s) 140 for presence information associated with a particular user 120. In example embodiments, the service provider device 162 may be configured to generate, either through the query API 164, or otherwise, a request for presence information, where the request indicates the user 120 for whom the request pertains, such as by referencing the user's user identification, user account, or any other identifier of the user 120.

If the service provider 160 is authorized to receive the requested presence information and if the requested presence information exists, then the service provider 160 may receive the requested service information form the presence server(s) 140. If the requested presence information does not exist, then, in some example embodiments, the service provider 160 may receive an indication, from the presence server(s) 140, that the requested presence information not being available. If the service provider 160 is not authorized to receive the requested presence information, then, in some example embodiments, the service provider 160 may receive an indication, from the presence server(s) 140, that the service provider 160 is not authorized to receive the requested presence information.

Once the service provider 160 receives, by streaming or by request, presence information pertaining to a user to whom the service provider 160 is to provide a service, consummating the service may be customized according to the received presence information. In some example embodiments, timing of the delivery of the service may be set based at least in part on the received presence information. In some other example embodiments, the mechanism, location, and/or user device 122 to which to deliver the service may be determined and/or modified based at least in part on the received presence information. In some other example embodiments, presence information of other users may be used to provide a service to a user.

As an example, a contacts service provider 160(1) may receive presence information related to a particular user's contacts and display to the particular user the availability of the people on the particular user's contact list. In this way, the availability of a number of other users may be provided to a separate user as a service, so that the recipient of the service may know which one of his contacts may be available for any interaction that the recipient of the service may wish to initiate with his/her contacts. As another example, a messaging service provider 160(2) may use presence information of a user to determine which one of the user's device to route a message that is intended for the user. In this way, the messaging service provider 160(2) would route the message based on the location and the availability of the user for whom the message is intended. As yet another example, a delivery service provider 160(3) may use presence information associated with a user to determine when and/or where to make a delivery. For example, the delivery service provider 160(3) may dispatch a delivery to either the user's home or work, depending on the user's present location as determined from the presence information. Alternatively, the delivery service provider 160(3) may determine if a home delivery of perishable and/or valuable items should be dispatched at the present time, based at least in part on whether the recipient is at home, as determined by presence information pertaining to that user, as received from the presence server(s) 140.

Figure 2:
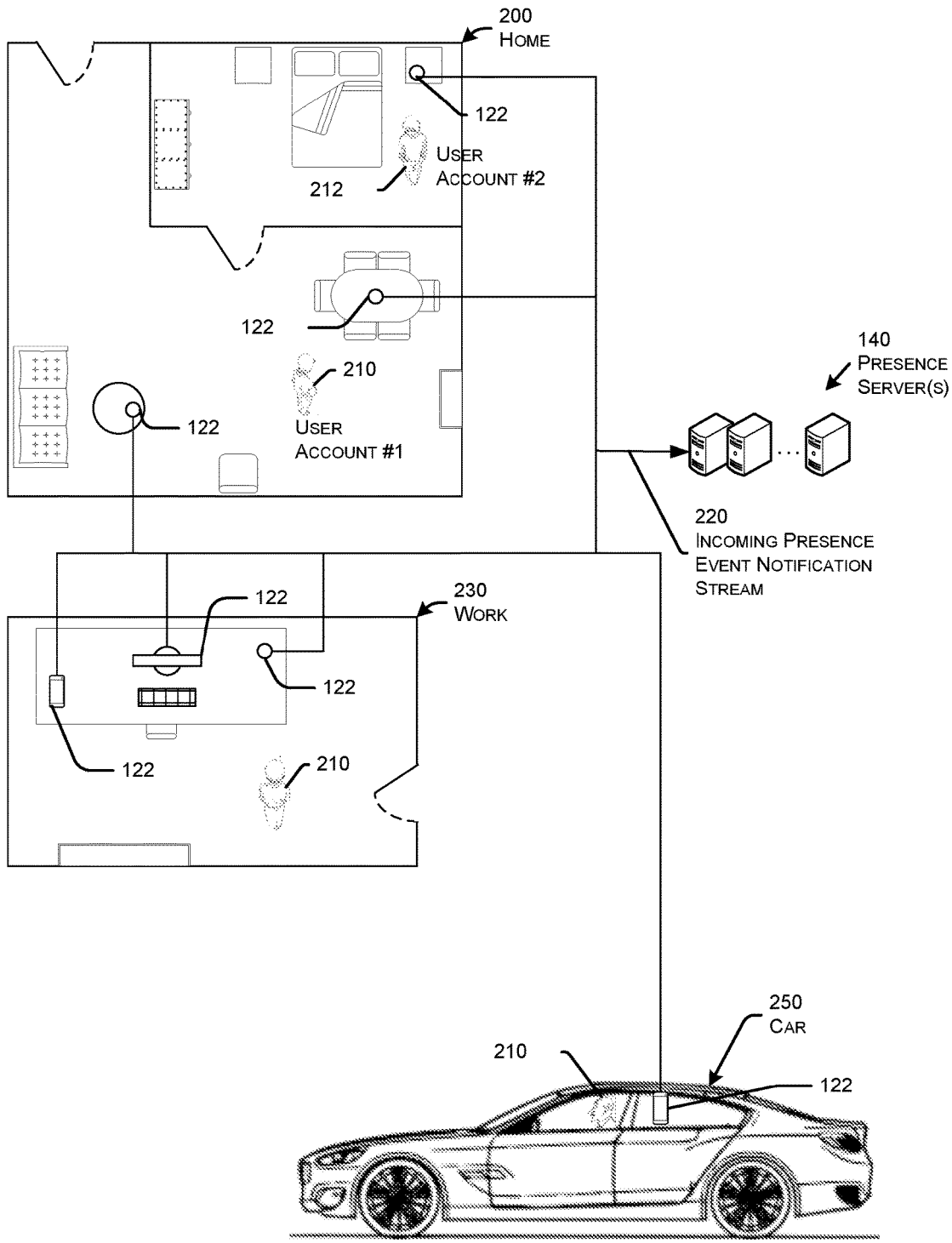
FIG. 2 illustrates a schematic diagram of more than one example locations at which a user may be located, and the presence events that may be reported from these locations associated with the user.

FIG. 2 illustrates a schematic diagram of more than one example locations 200, 230, 250 at which a user 210, 212 may be located, and the presence events that may be reported from these locations 200, 230, 250 associated with the user, in accordance with example embodiments of the disclosure. A first user 210 with a first user identification and/or first user account may be in a household with a second user 212 with a second user identification and/or user second user account. In the house 200, there may be a number of user devices 122 that may contribute presence-event notifications that may come to the presence server(s) 140 as a presence-event notification stream 220. In example embodiments, the user devices 122 and/or the presence server(s) 140 may be configured to distinguish between user 210 and user 212 when both of them are at home, by for example, any number of biometric data captured by any of the user devices 122. Additionally, the detection of presence events may occur for the user 210 from three (or more) different locations, such as his/her home 200, his/her office 230, and/or his/her car 250. Presence events generated in any one of these locations 200, 230, 250 may provide information pertaining to the location of the users 210, 212 in any of the other locations 200, 230, 250. In fact, the presence model(s) of the plug-ins 144 may use some a priori information, such as the members 210, 212 of the household of the home 200 to make improved predictions compared to not using a priori information. In this way, presence information about another user 210 may enhance the quality of presence information about another user 212. For example, if the presence-event notifications indicate that the user 210 is most likely in his/her car 250, and at the same time coughing noises are detected, such as by an audio capture device 122, in the home 200, then, even without being able to ascribe the coughing to user 212, the presence server may ascertain that it is user 212 that made the coughing sounds.

Figure 3:
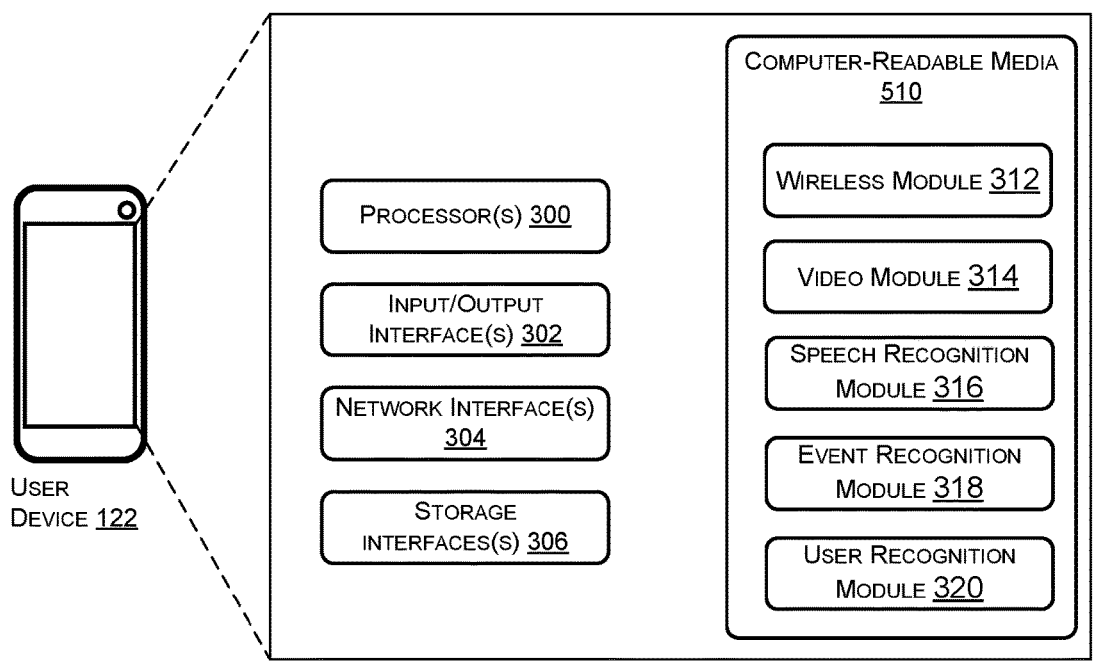
FIG. 3 illustrates a block diagram of an example architecture of a user device that reports a presence event to one or more presence server(s).

FIG. 3 illustrates a block diagram of an example architecture of a user device 122 that reports a presence event to one or more presence server(s) 140, in accordance with example embodiments of the disclosure. The user device 122 may include one or more processor(s) 300, one or more input/output (I/O) interface(s) 302, one or more network interface(s) 304, one or more storage interface(s) 306, and computer-readable media 310.

In some implementations, the processors(s) 300 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 300 may possess its own local memory, which also may store program modules, program data, and/or one or more operating systems. The one or more processor(s) 300 may include one or more cores.

The one or more I/O interface(s) 302 may enable the user device 122 to detect interaction with a user and/or other user devices 122, from which interaction presence-event notifications may be generated. The I/O interface(s) 302 may include a combination of hardware, software, and/or firmware and may include software drivers for enabling the operation of any variety of I/O device(s) integrated on the user device 122 or with which the user device interacts, such as displays, microphones, speakers, cameras, switches, and any other variety of sensors, or the like. The network interface(s) 304 may enable the user device to communicate via the one or more network(s) 130. The network interface(s) 304 may include a combination of hardware, software, and/or firmware and may include software drivers for enabling any variety of protocol-based communications, and any variety of wireline and/or wireless ports/antennas. The storage interface(s) 306 may enable the processor(s) 300 to interface and exchange data with the computer-readable medium 310, as well as any storage device(s) external to the user device 122.

The computer-readable media 310 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 310 may be implemented as computer-readable storage media ("CRSM"), which may be any available physical media accessible by the processor(s) 300 to execute instructions stored on the memory 310. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 300. The computer-readable media 310 may have an operating system (OS) and/or a variety of suitable applications stored thereon. The OS, when executed by the processor(s) 300 may enable management of hardware and/or software resources of the user device 122.

Several modules such as instruction, data stores, and so forth may be stored within the computer-readable media 310 and configured to execute on the processor(s) 300. The computer readable media 310 may have stored thereon a wireless module 312, a video module 314, a speech recognition module 316, an event recognition module 318, and a user recognition module 320. The modules 312, 314, 316, 318, 320 may have instructions stored thereon that when executed by the processor(s) 300 may enable various functions pertaining the detection of presence events and the generation and transmission of presence-event notifications.

The instructions stored in the wireless module 312, when executed by the processor(s) 300, may configure the user device 122 to detect wireless connections, such as Wi-Fi connections, Bluetooth® connections, ZigBee® connections, or indeed any type of wireless connections. The processor(s) 300 may be configured to generate a presence-event notification based at least in part on a wireless connection that may be pre-existing and/or newly established by the user device 122. For example, the processor(s) 300 may be configured to recognize a connection to a Wi-Fi AP that is associated with a particular location and may be configured to report that wireless connection to the Wi-Fi AP as a presence-event notification.

The instructions stored in the video module 314, when executed by the processor(s) 300, may configure the user device 122 to capture video, and based on the capture of the video, identify a presence event. In some example embodiments, the processor(s) 300 may be configured to perform facial recognition or other biometric analysis techniques to identify a particular user in a captured video or image. The processor(s) 300 may be configured to recognize a user in a video and or image and further may be configured to report that detection as a presence-event notification.

The instructions stored in the speech recognition module 316, when executed by the processor(s) 300, may configure the user device 122 to recognize speech, or indeed any noise (e.g., cough, sneeze, sniffling, shuffling noise, etc.) as a potential presence event. In some cases, a wake word uttered to a voice-controlled device may affect a recognition of a presence event. The processor(s) 300 may be configured to recognize a user in a sound and further may be configured to report that detection as a presence-event notification.

The instructions stored in the event recognition module 318, when executed by the processor(s) 300, may configure the user device 122 to identify a particular event as being a presence event. The processor(s) 300 may be configured to use any variety of actions to identify a presence event including, for example, a wireless connection between two user devices, a sound, a recorded video, a captured image, a detected motion, a user input, a toggling of a switch, an interaction with a smart appliance, an interaction with a voice-controlled device, an opening of a lock, a setting of a thermostat, a detected biometric signature, a detected cough, sneeze, sniffling, or shuffling noise, and/or a detected wake word The instructions stored in the user recognition module 320, when executed by the processor(s) 300, may configure the user device 122 to identify a particular user associated with a detected presence event. The processor(s) 300 may be configured to perform a variety of functions such as determining that the interaction was intended by a user, determining that the action was preprogrammed to be automatic by a user when the user is in a particular location, facial recognition, voice recognition, signature sound recognition (e.g., a particular way of sneezing), and/or frequency of movement analysis. The processor(s) may be configured to communicate, by way of the presence-event notification, any type of attribution of a presence event to a particular user. For example, a motion detector may be tripped and it may not be clear if the user, or his/her pet tripped the motion detector. In this case, the processor(s) 300 may be configured to discern between the user and the pet based on a variety of factors, such as a frequency of movement and type of movements.

Figure 4:
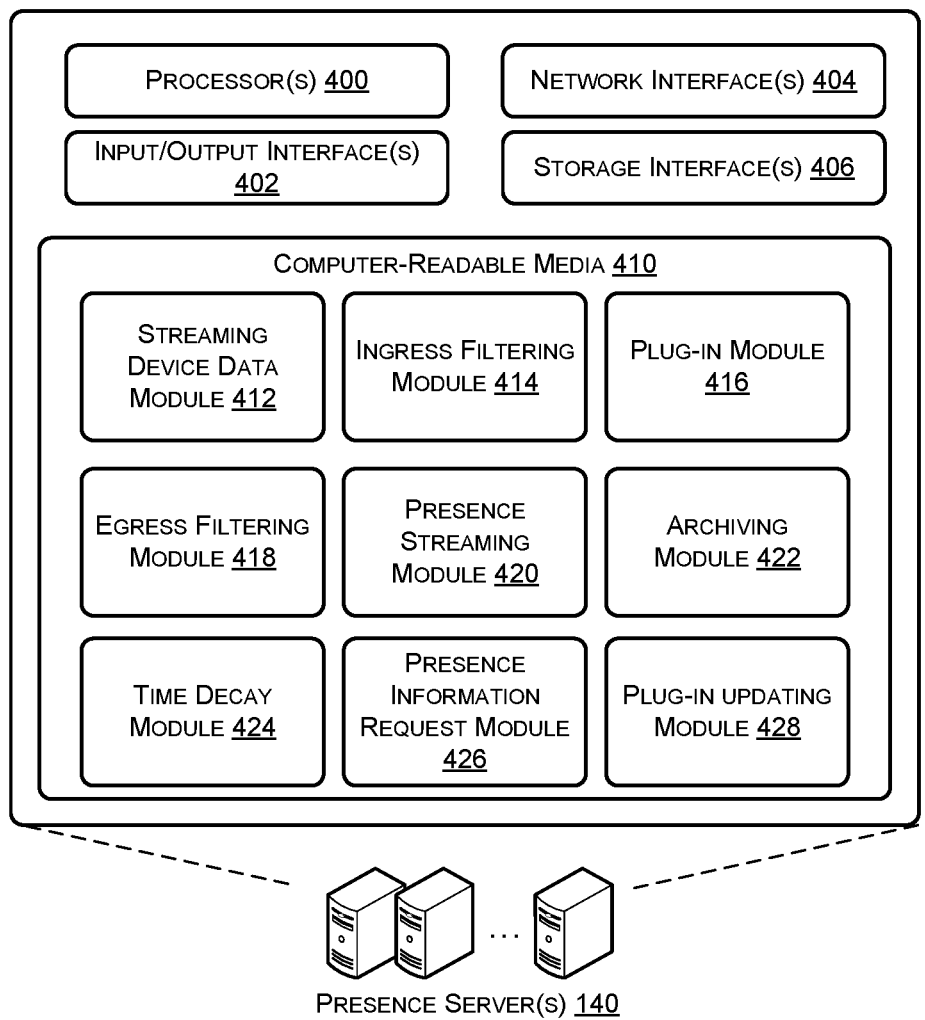
FIG. 4 illustrates a block diagram of an example of one or more presence server(s) that receive presence-event notification(s) and provide presence information.

FIG. 4 illustrates a block diagram of example one or more presence server(s) 140 that receive presence-event notification(s) and provide presence information, in accordance with example embodiments of the disclosure.

The presence server(s) 140 may include one or more processor(s) 400, one or more input/output (I/O) interface(s) 402, one or more network interface(s) 404, one or more storage interface(s) 406, and computer-readable media 410. The descriptions of the one or more processor(s) 400, the one or more input/output (I/O) interface(s) 402, the one or more network interface(s) 404, the one or more storage interface(s) 406, and the computer-readable media 410 may be substantially similar to the descriptions of the one or more processor(s) 300, the one or more input/output (I/O) interface(s) 302, the one or more network interface(s) 304, the one or more storage interface(s) 306, and the computer-readable media 310, respectively, as described in FIG. 3 with respect to the user device 122, and in the interest of brevity, will not be repeated here.

Several modules such as instruction, data stores, and so forth may be stored within the computer-readable media 410 and configured to execute on the processor(s) 400. The computer readable media 410 may have stored thereon a streaming device data module 412, an ingress filtering module 414, a plug-in module 416, an egress filtering module 418, a presence streaming module 420, an archiving module 422, a time decay module 424, a presence information request module 426, and a plug-in updating module 428. Each of the modules 412, 414, 416, 418, 420, 422, 424, 426, 428 may have instructions stored thereon that when executed by the processor(s) 400 may enable various functions pertaining to receiving presence-event notifications, and providing presence information.

The instructions stored in the streaming device data module 412, when executed by the processor(s) 400, may configure the presence server(s) 140 to stream presence-event notifications. The processor(s) 400 may be configured to identify a user associated with each of the presence-event notification(s) that it receives. In some example embodiments, the processor(s) 400 may be configured to store the presence events that it receives.

The instructions stored in the ingress filtering module 414, when executed by the processor(s) 400, may configure the presence server(s) 140 to apply the incoming presence-event notifications to an ingress filter to filter out presence-event notifications that may not be allowed to be used for generating presence information. In some example embodiments, the processor(s) 400 may be configured to use ingress filter parameters for filtering out presence events. The processor(s) 400 may be configured to filter presence events notifications according to any variety of criteria, such as the type of the presence event, the users to which they pertain, the age of the users, the geography of the user, combinations thereof, user-defined criteria, or the like.

The instructions stored in the plug-in module 416, when executed by the processor(s) 400, may configure the presence server(s) 140 to apply a post-ingress filtered presence event, or a stream of post-ingress filtered presence events to one or more plug-in modules to generate presence information. In some example embodiments, the processor(s) 400 may be configured to generate presence information that are binary in nature (e.g., available or not available), and in other example embodiments, the processor(s) 400 may be configured to generate presence information that may provide a probability and/or confidence level associated with a presence and/or availability prediction. The processor(s) 400 may further be configured to train the presence model(s) of the plug-ins using historical data, prior to deployment as part of the one or more presence plug-ins. The presence model may be any suitable type of predictive model, probabilistic distribution, statistical model, analytical equation, linear or non-linear mapping, or indeed any type of predictive mechanism that may relate an incoming presence-event notification, or a group of presence-event notifications, to a prediction of the user and/or group of users associated with the incoming presence-event notification or group of presence-event notifications. Such models may include, for example, direct mapping, machine learning models, regression models, neural network models, any variety of statistical models, combinations thereof, or the like. The presence models, as embodied in the plug-ins may take into account various confidence levels of user detection associated with different types of presence events.

The instructions stored in the egress filtering module 418, when executed by the processor(s) 400, may configure the presence server(s) 140 to filter presence information, as generated by the presence server(s). The processor(s) 400 may be configured to use egress filtering parameters based on criteria that may be universal, tailored to individual users, and/or based at least in part on the service provider that may have access to the presence information, to perform the egress filtering.

The instructions stored in the presence streaming module 420, when executed by the processor(s) 400, may configure the presence server(s) 140 to stream 150 out the presence information to one or more service providers 160 and their service provider devices 162. The instructions stored in the archiving module 422, when executed by the processor(s) 400, may configure the presence server(s) 140 to store the presence information in a presence datastore 152. The processor(s) 400 may further be configured to aggregate presence information pertaining to a common user 120. The processor(s) 400 may be configured to aggregate the presence information pertaining to the particular user 120 into a single file and/or document before streaming 150 and/or storing in the presence datastore 152.

The instructions stored in the time decay module 424, when executed by the processor(s) 400, may configure the presence server(s) 140 to implement a time decay function for presence events that are published. The processor(s) 400 may be configured to decrement a probability or confidence level of a person 120 being at and/or available at a location as time elapses from the occurrence of the presence event from which the presence information was generated. As newly revised probability for a user being at a location, or being available, is generated by the processor(s) 400 by using the time decay function(s), the processor(s) 400 may be configured to published new probability in a similar fashion as the initial presence information, such as by streaming 150 the new presence information and/or storing the new presence information in the presence datastore 152.

The instructions stored in the presence information request module 426, when executed by the processor(s) 400, may configure the presence server(s) 140 to receive a request for presence information from one or more service provider system(s) 162, either directly, or via the query API 164. The processor(s) 400 may further be configured to determine if the requesting service provider is authorized to receive the requested presence information, and if the service provider is authorized to receive the requested presence information, then the processor(s) 400 may be configured to retrieve the requested presence information from the presence datastore 152 and send the requested presence information to the requesting service provider 160, via the requesting service's service provider device 162.

The instructions stored in the plug-in updating module 428, when executed by the processor(s) 400, may configure the presence server(s) 140 to receive feedback event notifications, archive the feedback event notifications in a datastore, and use the feedback event notifications to retrain the presence model(s) of the plug-ins 144. The processor(s) 400 may further be configured to deploy the updated presence models.

In example embodiments, the presence server(s) 140 may be implemented as a distributed computing environment where certain tasks are performed by remote processing devices that are linked through a communications network. In a distributed computing environment, program modules may be located in both local and remote memory storage devices. Additionally, in example embodiments, the presence server(s) 140 may be implemented in a remote fashion by one or more instances of a virtual machine. In such an implementation, relatively high levels of scalability may be realized if additional instances may be added and/or subtracted relatively quickly and based at least in part on bandwidth demands and processing and/or storage loads on the presence server(s) 140.

Figure 5:
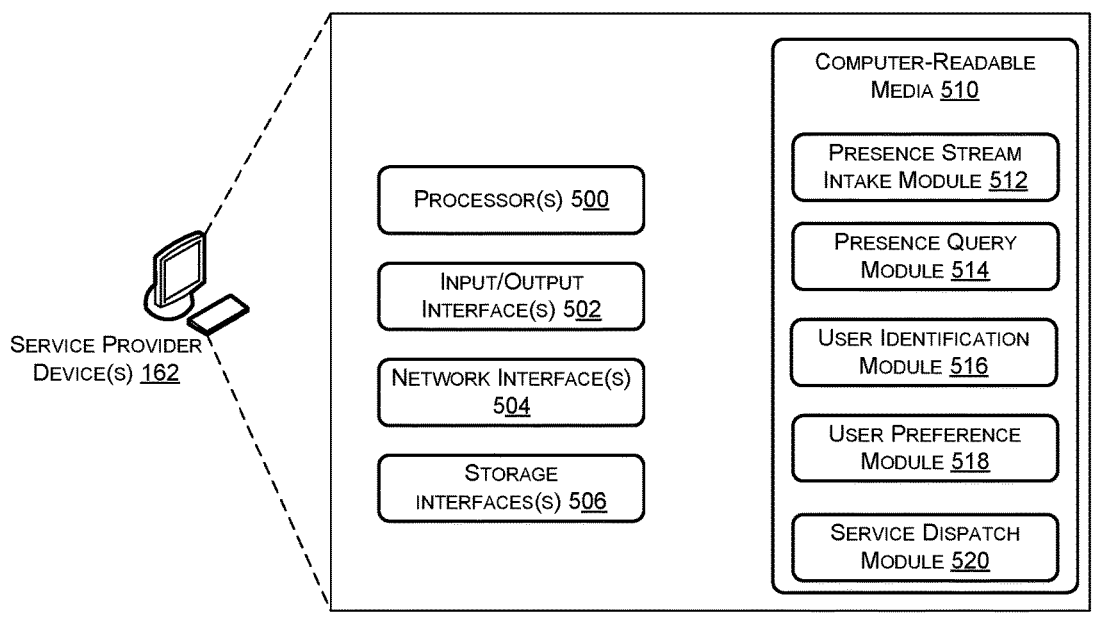
FIG. 5 illustrates a block diagram of an example service provider device that receives presence information and is configured to dispatch one or more service(s).

FIG. 5 illustrates a block diagram of an example service provider device 162 that receives presence information and is configured to dispatch one or more service(s), in accordance with example embodiments of the disclosure.

The service provider device 162 may include one or more processor(s) 500, one or more input/output (I/O) interface(s) 502, one or more network interface(s) 504, one or more storage interface(s) 506, and computer-readable media 510.

The descriptions of the one or more processor(s) 500, the one or more input/output (I/O) interface(s) 502, the one or more network interface(s) 504, the one or more storage interface(s) 506, and the computer-readable media 510 may be substantially similar to the descriptions of the one or more processor(s) 300, the one or more input/output (I/O) interface(s) 302, the one or more network interface(s) 304, the one or more storage interface(s) 306, and the computer-readable media 310, respectively, as described in FIG. 3 with respect to the user device 122, and in the interest of brevity, will not be repeated here.

Several modules such as instruction, data stores, and so forth may be stored within the computer-readable media 510 and configured to execute on the processor(s) 500. The computer readable media 510 may have stored thereon a presence stream intake module 512, a presence query module 514, a user identification module 516, a user preference module 518, and a service dispatch module 520. Each of the modules 512, 514, 516, 518, 520 may include instructions stored thereon that when executed by the processor(s) 500 may enable various functions pertaining to the intake, request, receipt, and use of presence information by a service provider device 162.

The instructions stored in the presence stream intake module 512, when executed by the processor(s) 500, may configure the service provider device 162 to receive the stream 150 of presence information, as published by the presence server(s) 140. The processor(s) 500 may be configured to further partition the stream into individual presence information.

The instructions stored in the presence query module 514, when executed by the processor(s) 500, may configure the service provider device 162 to generate, either through the query API 164, or as a standalone message, a request for presence information, where the request indicates the user 120 for whom the request pertains, such as by referencing the user's user identification, user account, or any other identifier of the user 120.

The instructions stored in the user identification module 516, when executed by the processor(s) 500, may configure the service provider device 162 to identify users 120 associated with presence information that is received via the stream 150 of presence information, as provided by the presence server(s) 140.

The instructions stored in the user preference module 518, when executed by the processor(s) 500, may configure the service provider device 162 to access user preference(s) associated with a particular user, as stored in association with the user's user identification (e.g., such as in a user account). The user preference(s) may indicate how to deliver service(s), using the presence information, such that user satisfaction may be enhanced. For example, a user 120 may prefer to have packages delivered to his/her work address. The processor(s) 500 may be configured to use this knowledge to attempt to deliver a package to the user's work address after confirming using the presence information that he/she is indeed at work.

The instructions stored in the service dispatch module 520, when executed by the processor(s) 500, may configure the service provider device 162 to dispatch a service. The processor(s) 500 may be configured to determine the manner (e.g., time, mechanism, location, etc.) based at least in part on the presence information and/or user preferences.

Figure 6:
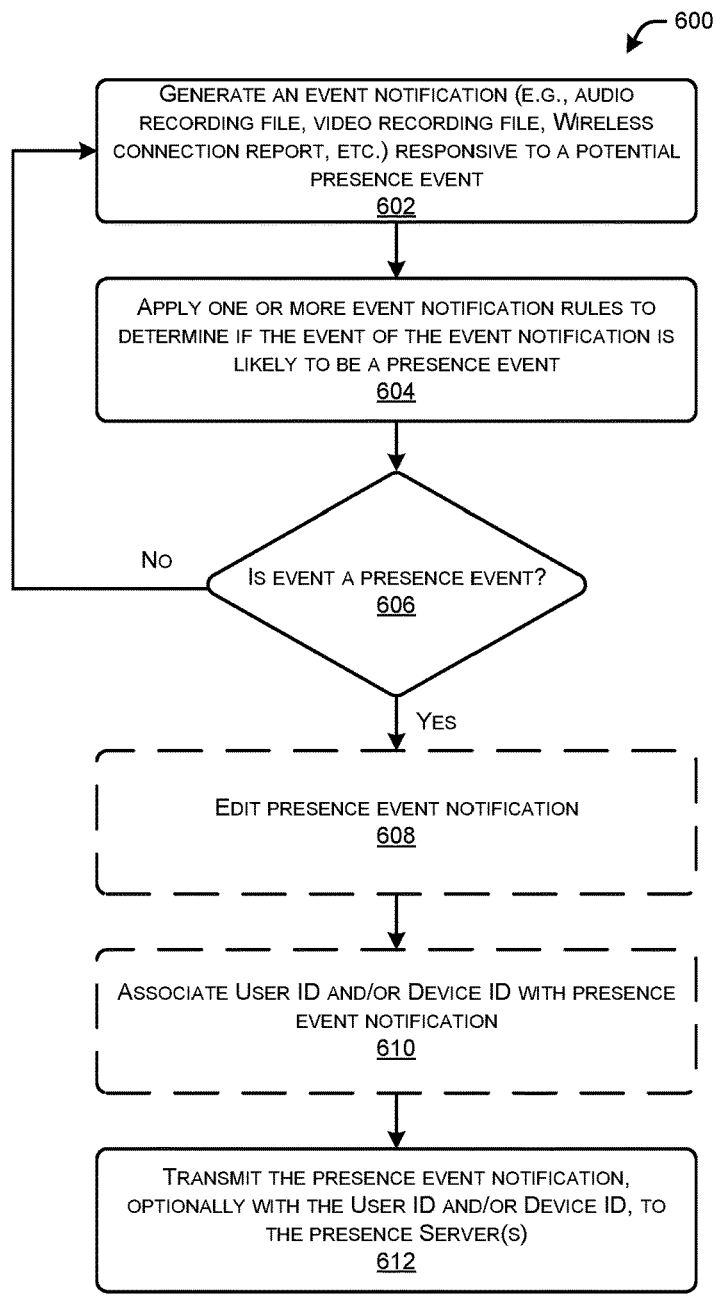
FIG. 6 illustrates a flow diagram of an example method for providing presence-event notifications to a presence server.

FIG. 6 illustrates a flow diagram of an example method 600 for providing presence-event notifications to a presence server, in accordance with example embodiments of the disclosure. In example embodiments, the method 600 may be performed by the user device 122 and the processor(s) 300 thereon by executing instructions stored in computer-readable media 310, in cooperation with one or more other components as depicted in environment 100 of FIG. 1.

At block 602, an event notification may be generated responsive to a potential presence event. The event notification may be generated responsive to an intentional and/or unintentional (by the user 120) interaction with the user device 120. At this point, the event notification may further entail any type of environmental element (e.g., noise, light, etc.) that may be perceived by the user device 122 as a potential interaction with a user 120 and/or another user device 122. In some example embodiments, the interaction of a device with a service may itself be a presence-event notification. For example, in some cases, a voice activated device 122(1) transmitting a notification of a wake word may, itself, be an event notification. In some example embodiments, the user device 122 may manage its sensor(s) for power management, such as by turning off a microphone when there may be continuous background sound and/or noise. Thus, in some example embodiments, the user device 122 may make a determination as to whether an event is to be recorded as an event notification.

At block 604, one or more event notification rules may be applied to determine if the event of the event notification is likely to be a presence event. The event notification rules may determine if the potential presence event is indeed likely to be a presence event. If the user device 122 determines that it detected environmental noise (e.g., a truck passing by outside, etc.) without any further follow-up interaction, then the user device may determine that that potential presence event is not, in fact, a true presence event, but rather just an artifact. However, other interactions, such as speaking a wake word, or a detected attempt at a follow-up interaction by the user, when the first interaction may have been ambiguous as to whether it was a presence event, may be indicative of the potential presence event actually being a presence event. In some alternate embodiments, a determination of whether an event notification is indeed a presence-event notification may be performed at a remote location, such as a service server associated with a service and/or the presence server(s) 140.

At block 606, it may be determined if the event is a presence event based on the application of the one or more event notification rules, as performed in block 604. If the event is determined to not be a presence event, then the method may return to block 602 to generate the next event notification. If, however, the event is determined to be a presence event, then the method 600 may proceed to optional block 608, where the event notification may be edited. At this point, the event notification of block 602 may be called a presence-event notification. The edits may entail providing more detail as to the presence event, such as an indication of speech, video, or detecting device related information associated with the detection of the presence event. In some example embodiments, such edits may be made as attachments and/or metadata associated with the presence-event notification.

At block 610, a user identification and/or user device identification may be associated with the presence-event notification. In example embodiments the user identification may entail providing the user identification as metadata, an attachment, a companion file, and/or incorporation of the payload of the presence-event notification itself.

At block 612, the presence-event notification may be transmitted to the presence server(s). The presence-event notification may optionally have the user identification indicated, such as in the presence-event notification itself, metadata, and/or an attachment to the presence-event notification.

In some example embodiments, in addition to the user device 122 generating presence event notifications, other entities, such as service servers (e.g., email server, calendar server, social media server, ecommerce server, etc.) may generate presence-event notifications for a user 120 and based at least in part on user activities that may be transmitted to the presence server(s) 140. It will also be appreciated that some of the operations, as discussed above, may be performed on the presence server(s) 140. For example, in some cases, the user device 122 may not perform the processes for determining if an event is indeed a presence event. In these cases, such a determination may be performed at another entity, such as the presence server(s) 140.

Although the process 600 is described with reference to the flowchart illustrated in FIG. 6, many other methods for performing the acts associated with the process 600 may be used. For example, the order of the steps may be changed, some of the steps described may be optional, and additional steps may be included, in accordance with example embodiments of the disclosure.

Figure 7:
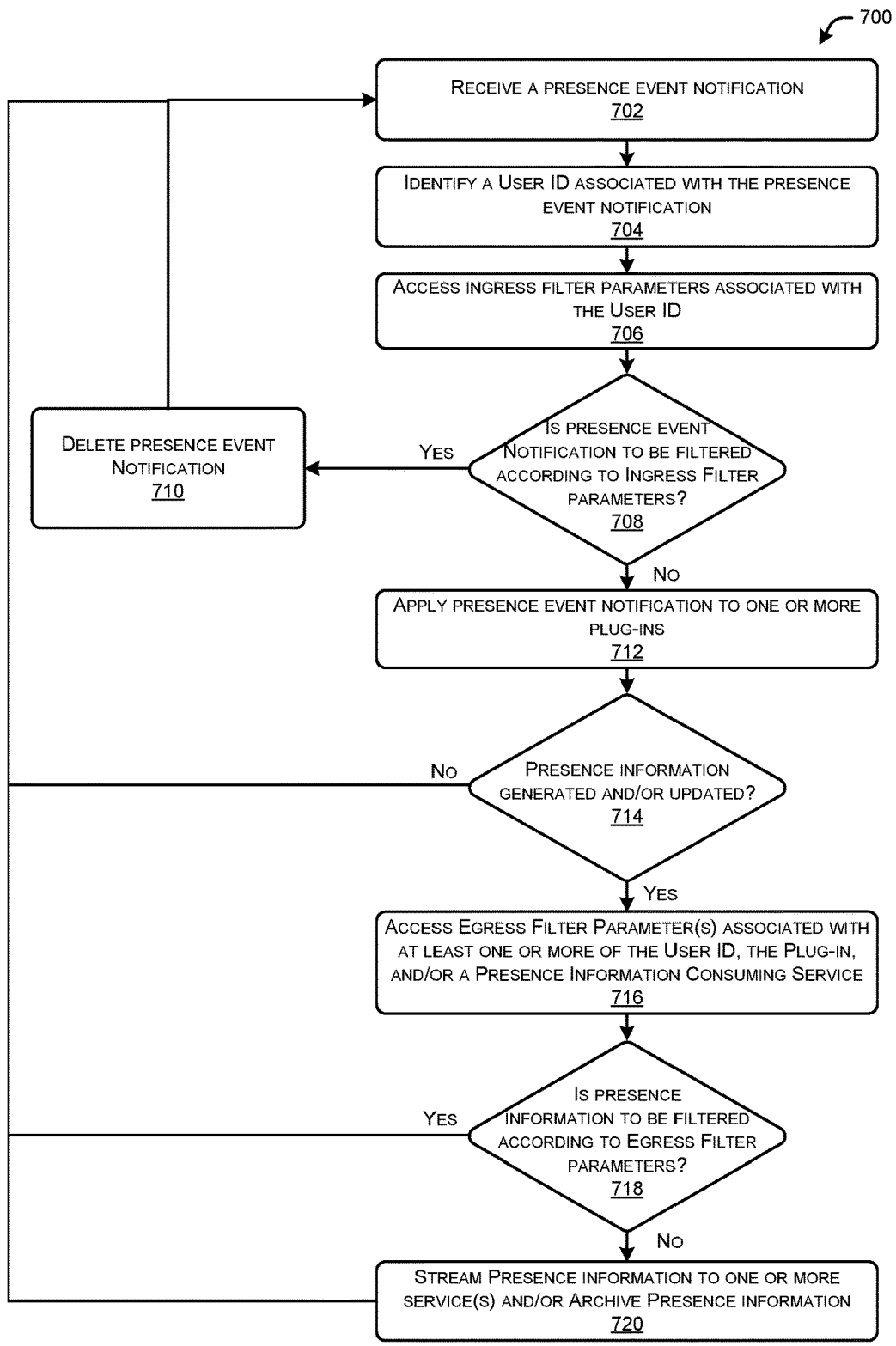
FIG. 7 illustrates a flow diagram of an example method for receiving a presence-event notification and providing presence information.

FIG. 7 illustrates a flow diagram of an example method 700 for receiving a presence-event notification and providing presence information, in accordance with example embodiments of the disclosure. In example embodiments, the method 600 may be performed by the presence server(s) 140 and the processor(s) 400 thereon by executing instructions stored in computer-readable media 410, in cooperation with one or more other components as depicted in environment 100 of FIG. 1.

At block 702, a presence-event notification may be received. In some cases, a user identification and/or user device identification may be provided in and/or with the presence-event notification, as received from the user device 122, another service server, and/or another plug-in. In other cases, the presence-event notification may include an identification of the user device 122 that generated the presence-event notification, but not the user identification. The presence-event notification may further include the type of presence event (e.g., utterance of the wake word, etc.).

At block 704, a user identification and/or user device identification associated with the presence-event notification may be identified. In the case where the user identification is provided with the presence-event notification, the user identification may be extracted, such as by parsing the presence-event notification. In the case where the reporting user device identification is provided, a table associating the user device identifications to user identifications may be consulted. This table may, in example embodiments, be stored at the presence server(s) 140, such as associated with a user account for each users 120 who interact with the presence services, as provided by the presence server(s) 140.

At block 706, ingress filter parameters associated with the user may be accessed. It should be noted that in some example embodiments, all users 120, or groups of users 120 may be associated with the same ingress filter parameters. In other example embodiments, users 120 may have individualized sets of ingress filter parameters. In still further example embodiments, the ingress filter parameters for a user 120 may be user-defined. In other words, the user 120 may specify which presence-event notifications or types of presence-event notifications may not be used for determining presence information for that user.

At block 708 it may be determined if the presence-event notification is to be filtered according to the ingress filter parameters. The presence-event notification may be compared to the ingress filter parameters to determine if the presence event associated with the presence-event notification is disallowed from being used to determine presence information for the user. If it is determined that the presence-event notification is to be filtered, then the method 700 may proceed to block 710, where the presence-event notification may be discarded, and the method 700 may return to block 702 to receive the next presence-event notification. If, however, at block 708 it is determined that the presence-event notification is not to be discarded, then the method 700 may proceed to block 712, where the presence-event notification may be applied to one or more plug-ins. In some example embodiments, not all of the plug-ins 144 may be permitted to receive every type (e.g., for every user, for every user activity, etc.) of presence-event notifications. In these embodiments, the presence server(s) 140 may determine if each of the particular plug-ins 144 are to receive a received presence-event notification.

At block 714, it may be determined if presence information is generated and/or updated. If the presence event of the presence-event notification is relatively insignificant, then presence information may not result from that presence-event notification. If no presence information is generated and/or updated, then the method may return to block 702 to receive the next presence-event notification. If, however, at block 714, presence information is generated, then the method 700 may proceed to block 716, where egress filter parameter(s) may be accessed, where the egress filter parameters may be associated with at least one or more of the user identification (e.g., the user), the plug-in, and/or presence information consuming service(s).

At block 718, it may be determined if the presence information is to be filtered, based at least in part on the egress filter parameters. If the presence information is to be filtered out according to the egress filter parameters, then the presence information may not be published, and the method may return to block 702 to receive the next presence-event notification.

If, however, the presence information is not to be filtered out, then the method 700 may proceed to block 720, where the presence information may be streamed 150 to one or more service provider(s) 160 and/or archived in the presence database 152. After streaming and/or archiving the presence information, the method 700 may return to 702 to receive additional presence event notifications.

In some example embodiments, there may be one or more plug-ins 144 that may consume presence information generated by other presence plug-ins 144. In these cases, the presence information may be provided to one or more dependent plug-ins 144.

Although the process 700 is described with reference to the flowchart illustrated in FIG. 7, many other methods for performing the acts associated with the process 700 may be used. For example, the order of the steps may be changed, some of the steps described may be optional, and additional steps may be included, in accordance with example embodiments of the disclosure.

Figure 8:
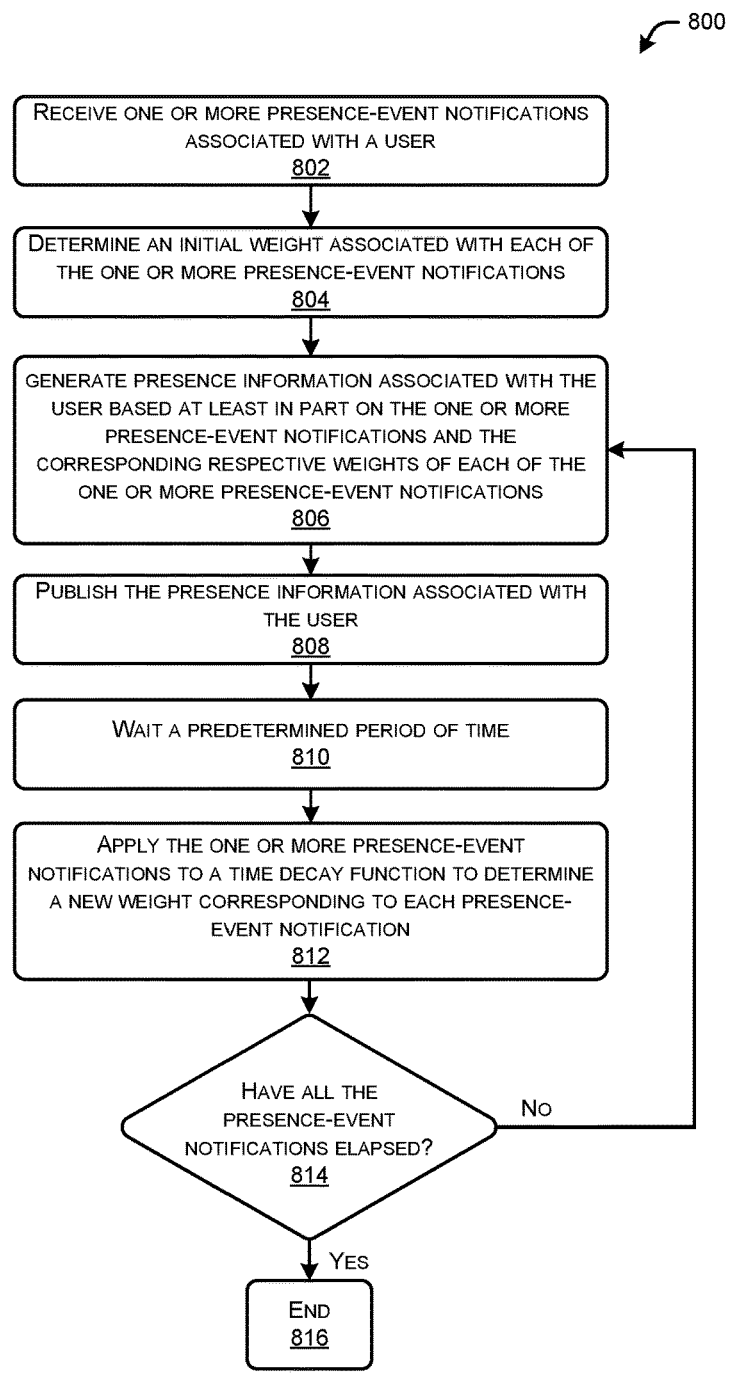
FIG. 8 illustrates a flow diagram of an example method for generating a revised probability of a user being present at a particular location.

FIG. 8 illustrates a flow diagram of an example method 800 for generating a revised probability of a user being present at a particular location, in accordance with example embodiments of the disclosure. In example embodiments, the method 800 may be performed by the presence server(s) 140 and the processor(s) 400 thereon by executing instructions stored in computer-readable media 410, in cooperation with one or more other components as depicted in environment 100 of FIG. 1.

At block 802, one or more presence-event notifications associated with a user may be received. The one or more presence-event notifications may be received from one or more user devices 122, from service servers with which the user 120 has interacted, and/or from one or more plug-ins that may have previously generated information about the user. In example embodiments, each of the one or more presence-event notifications may be retrieved from the presence-event notification datastore 146.

At block 804, an initial weight associated with each of the one or more presence-event notifications may be determined. The weight corresponding to each of the one or more presence-event notifications may be based at least in part on the age (e.g., elapsed time from generation, etc.) of each of the presence-event notifications.

At block 806, presence information associated with the user may be generated based at least on the one or more presence-event notifications and their corresponding respective weights. The presence information may be generated using one or more of the presence plug-ins 144 having presence models incorporated therein. The weights may provide an indication to each of the presence models of the confidence associated with the corresponding presence-event. The confidence of a presence event as a predictor of a person's location, availability, and/or propensity to engage in an activity generally decreases with elapsed time after the occurrence of the presence event. As a result, the weight associated with the presence event may provide a mechanism for the presence plug-ins to consider effects of a particular amount of elapsed time after the occurrence of a particular presence event that is used to generate the presence information.

At 808, the presence information for the user may be published. Publishing this revised presence information may entail streaming 150 the revised presence information and/or storing the revised presence information in the presence datastore 152.

At block 810, the method 800 may wait a predetermined period of time before performing any type of reweighting of the presence-event notifications used for determining the presence information. After waiting the predetermined period of time, at block 812, the presence-event notifications may be applied to a time decay function that may adjust (e.g., decrease) the weight associated with each of the presence-event notifications for the presence models using those presence-event notifications and corresponding weights. The time decay function may provide any suitable mapping of how the weight of each of the presence-event notifications are to decay with time.

At block 814, it may be determined if all the presence-event notifications have elapsed. In other words, it may be determined if the presence-event notifications are old enough, so that those presence-event information may no longer be useful and the revised probability of presence information is at a relatively low level for the presence information to provide much usefulness in the context of service delivery or predictive power of the user actions. If the original presence information has elapsed, then the method 800 may end 816. On the other hand, if the original presence information has not elapsed, then the method 800 may return back to block 806, where new presence information may be generated based at least in part on time decayed weights associated with each of the presence-event notifications.

The method 800 may be reset if new presence-event notifications come in to the presence server(s) 140 for the user that may be used to produce fresh presence information for the user. In that case, old presence-event notifications may be replaced with new presence-event notifications, rendering moot the need to decrement the weight of the old presence-event notifications that are not used in subsequent presence information generation.

Although the process 800 is described with reference to the flowchart illustrated in FIG. 8, many other methods performing the acts associated with the process 800 may be used. For example, the order of the steps may be changed, some of the steps described may be optional, and additional steps may be included, in accordance with example embodiments of the disclosure.

Figure 9:
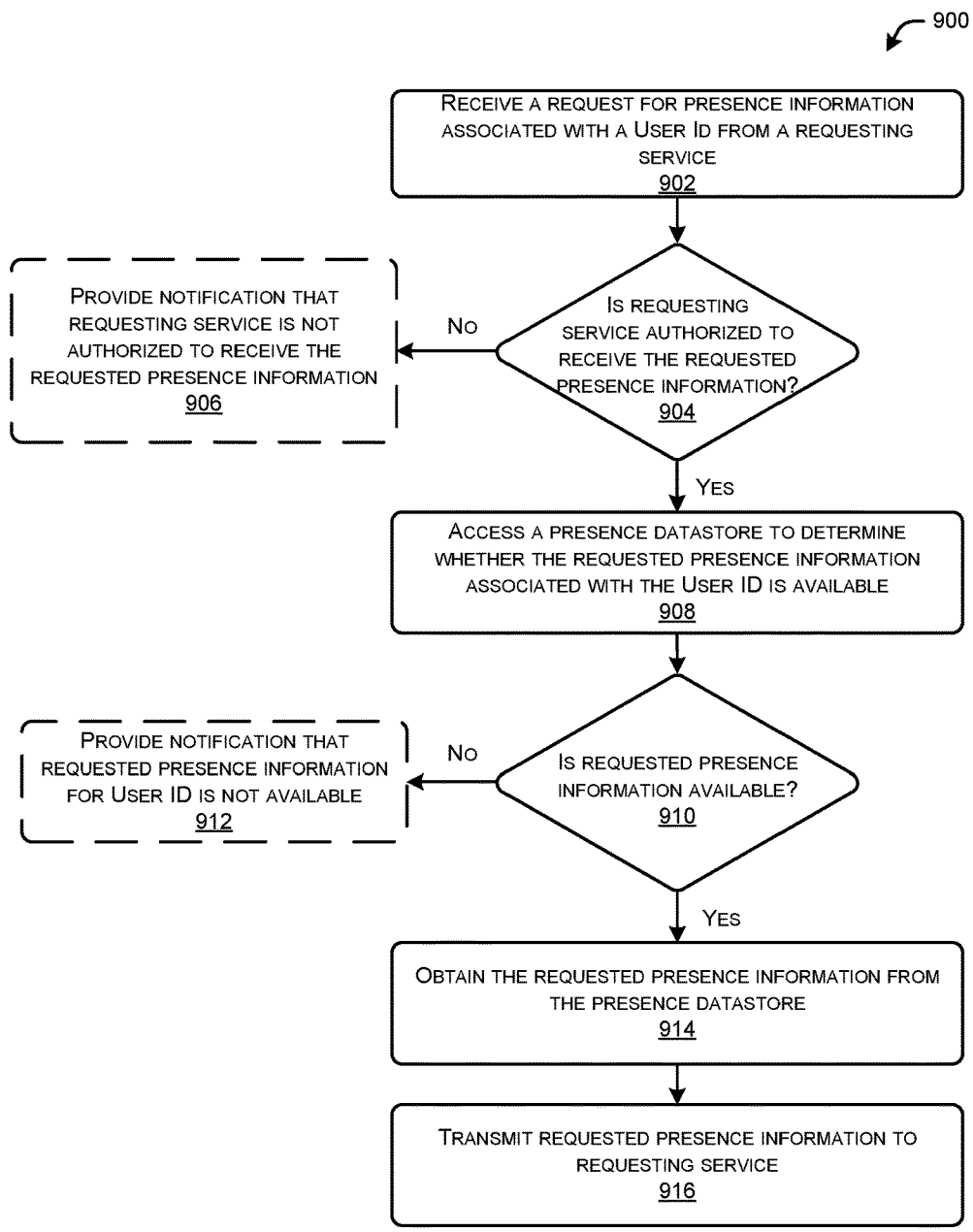
FIG. 9 illustrates a flow diagram of an example method for receiving a request for presence information and fulfilling the request.

FIG. 9 illustrates a flow diagram of an example method 900 for receiving a request for presence information and fulfilling the request, in accordance with example embodiments of the disclosure. In example embodiments, the method 900 may be performed by the presence server(s) 140 and the processor(s) 400 thereon by executing instructions stored in computer-readable media 410, in cooperation with one or more other components as depicted in environment 100 of FIG. 1.

At block 902, a request for presence information associated with a user identification may be received from a requesting service. In some example embodiments, the notification may be a message generated at the service provider system 162. In other example embodiments, the request may be generated via the query API 164.

At block 904, it may be determined if the requesting service is authorized to receive the requested presence information. If it is determined that the requesting service provider 160 is not authorized to receive the requested presence information, then at block 906, optionally, the requesting service may be notified that the requesting service is not authorized to receive the requested presence information. In some example embodiments, no notification of a lack of authorization to receive the requested presence information may be provided to the requesting service provider 160. In some cases, the requesting service provider 160 may interpret a lack of a response to indicate that either the requested presence information is not available, or that the requesting service provider 160 is not authorized to receive the requested presence information. On the other hand, if at block 906, it is determined that the requesting service is authorized to receive the requested presence information, then the method 900 may proceed to block 908 where it may be determined if the requested presence information is available. The presence datastore 152 may be accessed to determine whether the requested presence information is available. The user identification may be used to reference the requested presence information in the presence datastore 152.

At block 910, if it is determined that the requested presence information is not available, then the method 900 may optionally notify the requesting service that the requested presence information is not available at block 912. In some example embodiments, no notification of unavailability of the requested presence information may be provided. If, however, at block 910, the requested presence information is available, such as stored in the presence datastore 152, then the method 900 may proceed to block 914, where the requested presence information may be obtained from the presence datastore 152. In some example embodiments, there may be a tier of user permission that may gate the disbursement of presence information. For example, there may be an additional check for user 122 authorization for his/her her presence information (e.g., egress filtering, or otherwise) before the presence information is provided to a requesting service. At block 916, the requested presence information may be transmitted to the requesting service.

Although the process 900 is described with reference to the flowchart illustrated in FIG. 9, many other methods performing the acts associated with the process 900 may be used. For example, the order of the steps may be changed, some of the steps described may be optional, and additional steps may be included, in accordance with example embodiments of the disclosure.

Figure 10:
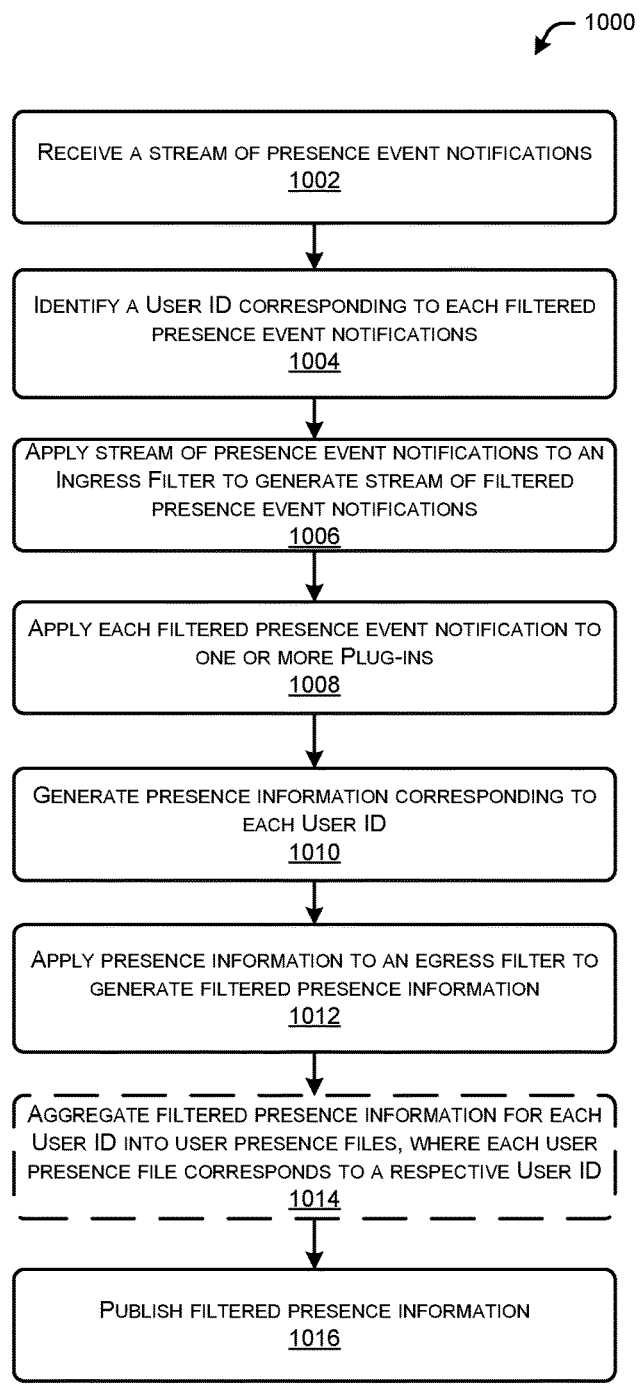
FIG. 10 illustrates a flow diagram of an example method of receiving a stream of presence-event notifications, generating presence information from the stream, and publishing the presence information.

FIG. 10 illustrates a flow diagram of an example method 1000 of receiving a stream of presence-event notifications, generating presence information from the stream, and publishing the presence information, in accordance with example embodiments of the disclosure. In example embodiments, the method 1000 may be performed by the presence server(s) 140 and the processor(s) 400 thereon by executing instructions stored in computer-readable media 410, in cooperation with one or more other components as depicted in environment 100 of FIG. 1.

At block 1002, a stream of presence-event notifications may be received. As discussed above, the stream 150 may include presence-event notifications from multiple users 120 and multiple user devices 122. At block 1004, a user identification corresponding to each filtered presence-event notification may be identified. In some example embodiments, this may entail parsing the presence-event notification to identify the appended user identification. In other example embodiments, the presence-event notification may include a user device identification, and the user device identification may be used to identify the user associated with each of the presence-event notifications in the stream 150. At block 1006, the stream of presence notifications may be applied to an ingress filter to generate a stream of filtered presence-event notifications.

At block 1008, each filtered presence-event notification is applied to one or more plug-ins. At block 1010, presence information corresponding to each user identification may be generated. The presence information, therefore, is based at least in part on the presence-event notifications for each of the users and the presence models embodied in the presence plug-ins 144. At block 1012, the presence information corresponding to each user identification may be applied to an egress filter to generate filtered presence information. At block 1014, optionally, filtered presence information may be aggregated for each user identification into user presence files, where each user presence file corresponds to a respective user identification.

At block 1016, the filtered presence information may be published. Publishing, in example embodiments, may entail providing the presence information in an outbound stream. In other example embodiments, publishing may entail storing, such as for future query, the presence information, associated with its corresponding user identification in the presence datastore 152. In yet other example embodiments, the presence file corresponding to each user identification, may be streamed out to one or more service providers and/or stored in the presence datastore 152 for future query.

Although the process 1000 is described with reference to the flowchart illustrated in FIG. 10, many other methods performing the acts associated with the process 1000 may be used. For example, the order of the steps may be changed, some of the steps described may be optional, and additional steps may be included, in accordance with example embodiments of the disclosure.

Figure 11:
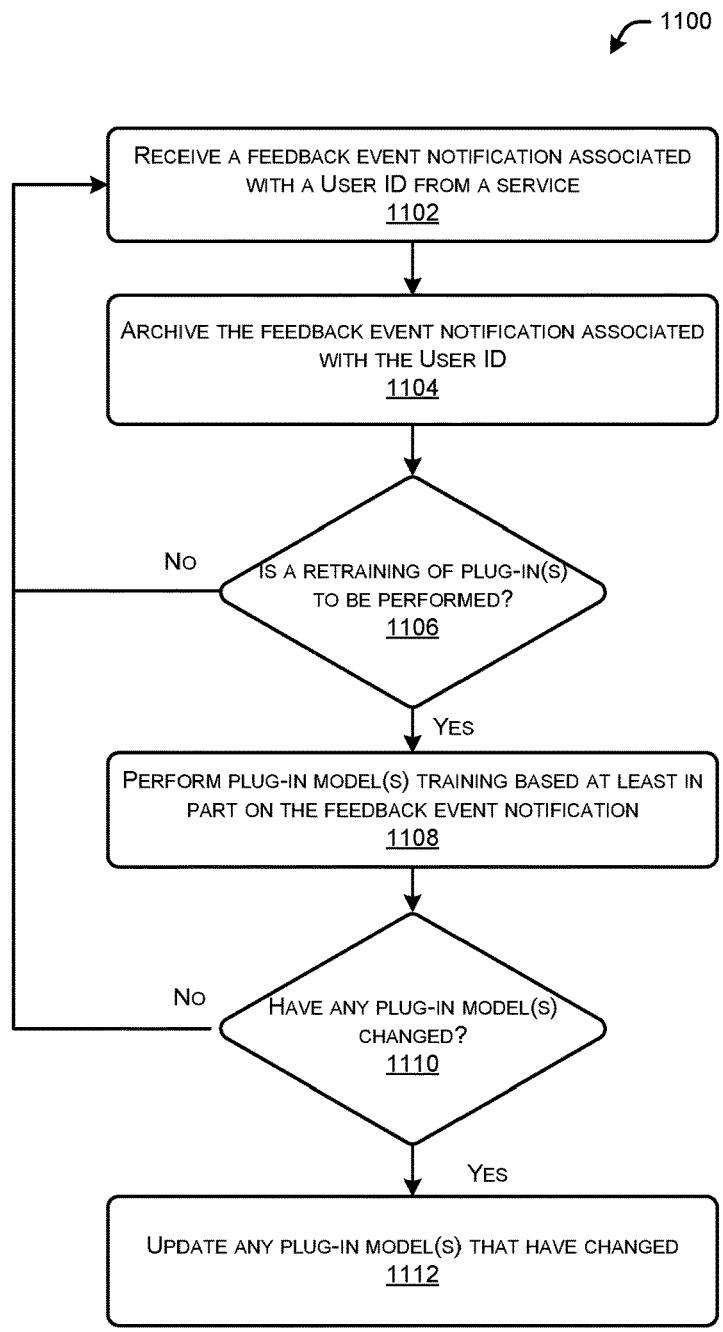
FIG. 11 illustrates a flow diagram of an example method of receiving feedback event notification(s) and revising plug-in models based on the received feedback event notification.

FIG. 11 illustrates a flow diagram of an example method 1100 of receiving feedback event notification(s) and revising plug-in models based on the received feedback event notification, in accordance with example embodiments of the disclosure. In example embodiments, the method 1100 may be performed by the presence server(s) 140 and the processor(s) 400 thereon by executing instructions stored in computer-readable media 410, in cooperation with one or more other components as depicted in environment 100 of FIG. 1.

At block 1102, a feedback event notification associated with a user identification may be received from a service. The feedback event may be a determination, by a service provider 160, of whether a user 120 was in a particular location and/or available. In some cases, the feedback event may agree with what the presence information predicted, and in other cases, the feedback event notification may be contrary to what was predicted by the presence information. At block 1104, the feedback event notification may be archived, as associated with the user identification. This feedback event notification may be archived in any suitable datastore, such as the presence datastore 152.

At block 1106, it may be determined if a retraining of the plug-in(s) (e.g., the presence models of the plug-ins) are to be performed. This determination may be made by considering any one or more of how much time has passed since the last training of the models, the number of feedback event notifications that have accumulated in the archive, and/or how the models are performing (e.g., the number of incorrect predictions). If it is determined that a retraining is not to be performed, then the method may return to block 1102 to receive additional feedback event notifications. However, if it is determined that a retraining is to be performed, then the method 1100 may proceed to block 1108, where the plug-in model(s) are retrained based at least in part on the feedback event notification.

At block 1110, it may be determined if any of the plug-in model(s) have changed. If none of the plug-in model(s) have changed, then the method may return to block 1102 to receive additional feedback event notification(s). If, on the other hand, at least one plug-in model has changed as a result of the retraining, then at block 1112, any of the plug-in model(s) that changed may be updated in the plug-in. As a result, future determinations of presence information may use the retrained presence model(s), as provided in the one or more plug-ins 144.

When a presence model is updated, the updated model may not only benefit, by way of relatively greater accuracy and/or precision, the service provider 160 that may have prompted, or was most responsible in triggering a retraining of the model, but all of the service providers 160 that may use that revised model.

Although the process 1100 is described with reference to the flowchart illustrated in FIG. 11, many other methods performing the acts associated with the process 1100 may be used. For example, the order of the steps may be changed, some of the steps described may be optional, and additional steps may be included, in accordance with example embodiments of the disclosure.

Figure 12:
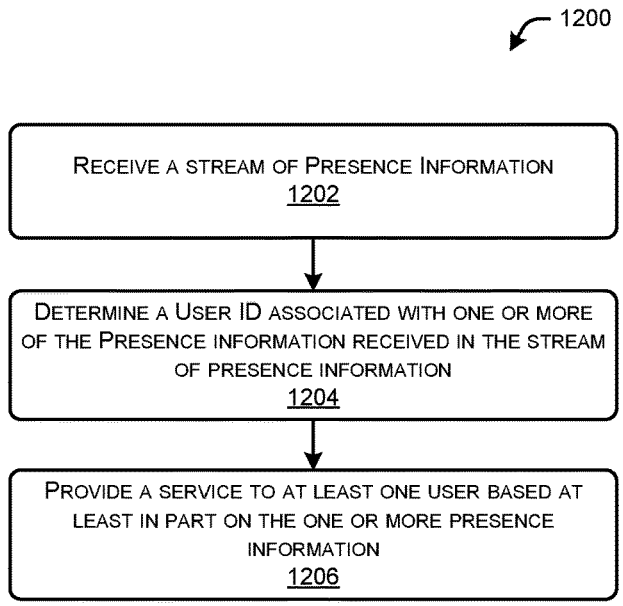
FIG. 12 illustrates a flow diagram of an example method for receiving presence information and dispatching a service based at least in part on the presence information.

FIG. 12 illustrates a flow diagram of an example method 1200 for receiving presence information and dispatching a service based at least in part on the presence information, in accordance with example embodiments of the disclosure. In example embodiments, the method 1200 may be performed by the service provider device 162 and the processor(s) 500 thereon by executing instructions stored in computer-readable media 510, in cooperation with one or more other components as depicted in environment 100 of FIG. 1.

At block 1202, a stream of presence information may be received. The presence information, in example embodiments, may be tagged with a user identification. At block 1204, a user identification associated with one or more of the presence information received in the stream of presence information may be determined.

At block 1206, a service may be provided to at least one user based at least in part on the one or more presence information. For example, a telemarketing service may determine that a particular user, as identified by the operations in block 1204, may be available to receive a call, as determined by presence information about the user in the stream of presence information, and in turn, the telemarketer may place a call to this user. The service, as discussed herein, may be any suitable type of service, including, for example, physical or electronic delivery of items or services, targeting of advertising, targeting of marketing (e.g., coupons, incentives, etc.), providing other context-based information, combinations thereof, or the like. For example, if a particular person is listening to music by a particular artist, the presence information may include contextual information that indicates the particular artist and/or the song, and a service may attempt to sell additional music produced by that artist.

Although the process 1200 is described with reference to the flowchart illustrated in FIG. 12, many other methods performing the acts associated with the process 1200 may be used. For example, the order of the steps may be changed, some of the steps described may be optional, and additional steps may be included, in accordance with example embodiments of the disclosure.

Figure 13:
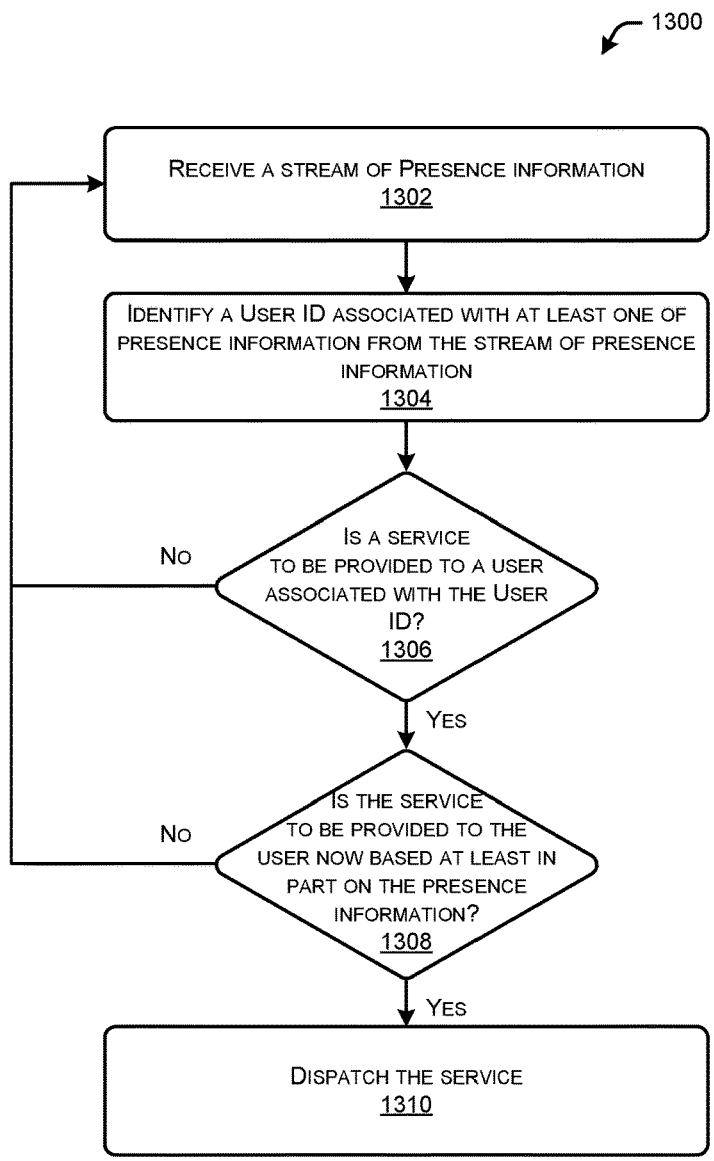
FIG. 13 illustrates a flow diagram of an example method for receiving a stream of presence information and determining if a service is to be dispatched based at least in part on the stream of presence information.

FIG. 13 illustrates a flow diagram of an example method 1300 for receiving a stream of presence information and determining if a service is to be dispatched based at least in part on the stream of presence information, in accordance with example embodiments of the disclosure. In example embodiments, the method 1300 may be performed by the service provider device 162 and the processor(s) 500 thereon by executing instructions stored in computer-readable media 510, in cooperation with one or more other components as depicted in environment 100 of FIG. 1.

At block 1302, a stream of presence information may be received. The presence information that make up the stream 150, in example embodiments, may be tagged with a user identification. At block 1304 a user identification may be identified for at least one of the presence information from the stream. In some example embodiments, this may be performed by parsing the presence information to detect the user identification provided therein.

At block 1306, it may be determined if a service is to be provided to a user associated with the user identification, as determined in block 1304. If a service is not to be provided to the user, then the method 1300 may return to block 1302 where the stream of presence information may be continued to be received. If, however, it is determined at block 1306 that a service is to be provided to the user, then the method may proceed to block 1308, where it may be determined if the service is to be provided at this present time, based at least in part on the presence information. If it is determined that the service is not to be provided at the present time, for example, because the user is not currently available per the presence information, then the method may return to block 1302 to continue to receive the stream of presence information. If, on the other hand, at block 1308 it is determined that the service is to be provided at the present time, then the method may proceed to block 1310, where the service may be dispatched. In some example embodiments, a mechanism by which to dispatch and/or provide the service may further be determined using contextual information that may be available about the user or group of users in the presence information received.

Although the process 1300 is described with reference to the flowchart illustrated in FIG. 13, many other methods performing the acts associated with the process 1300 may be used. For example, the order of the steps may be changed, some of the steps described may be optional, and additional steps may be included, in accordance with example embodiments of the disclosure.

Figure 14:
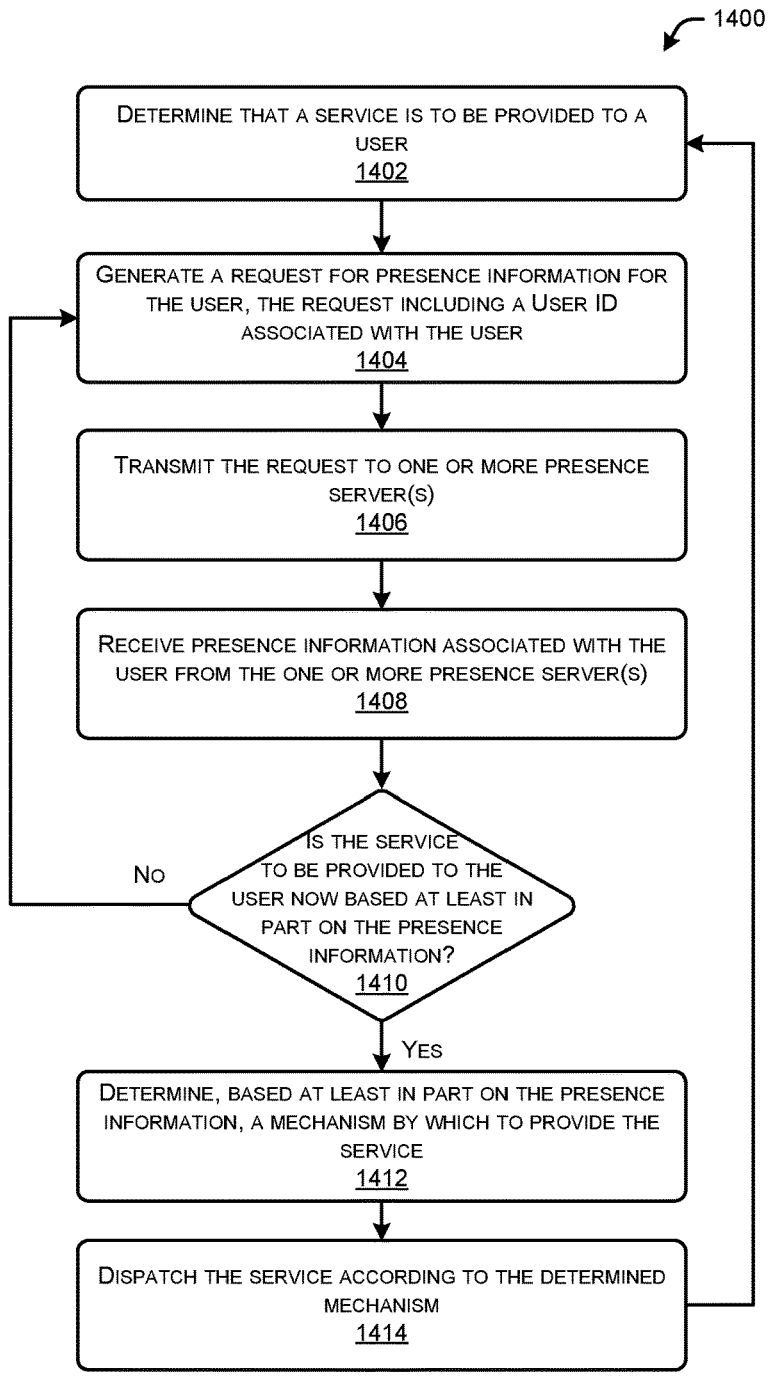
FIG. 14 illustrates a flow diagram of an example method for generating and transmitting a request for presence information, and dispatching a service based on received presence information.

FIG. 14 illustrates a flow diagram of an example method 1400 for generating and transmitting a request for presence information, and dispatching a service based on received presence information, in accordance with example embodiments of the disclosure. In example embodiments, the method 1400 may be performed by the service provider device 162 and the processor(s) 500 thereon by executing instructions stored in computer-readable media 510, in cooperation with one or more other components as depicted in environment 100 of FIG. 1.

At block 1402, it may be determined that a service is to be provided to a user. At block 1404, a request for presence information for the user may be generated, where the request may include a user identification associated with the user. In some example embodiments, the user notification may be a message formed by the service provider system 162. In other example embodiments, the request may be via the query API 164 for requesting presence information.

At block 1406, the request may be transmitted to one or more presence server(s). In response to the request, at block 1408, presence information associated with the user may be received from the one or more presence server(s). At block 1410, it may be determined if the service is to be delivered at the present time based at least in part on the presence information.

At block 1412, a mechanism by which to provide the service may be determined based at least in part on the presence information. This mechanism may entail any variety of suitable options, such as what physical location to use for providing the service, what user device to provide the service on, or the like. In some cases, the mechanism may entail using contextual information to tailor the service to the user or group of users that are to receive the service. For example, the service may be delivery of advertising, and the mechanism of service delivery may entail determining what advertisement is to be provided to a user, based on contextual information, such as demographic and/or interest information about the user that may be available in the presence information.

At block 1414, the service may be dispatched according to the determined mechanism from the processes of block 1412. After dispatching the service, the method 1400 may return back to block 1402 to provide the next service.

Although the process 1400 is described with reference to the flowchart illustrated in FIG. 14, many other methods performing the acts associated with the process 1400 may be used. For example, the order of the steps may be changed, some of the steps described may be optional, and additional steps may be included, in accordance with example embodiments of the disclosure.

Figure 15:
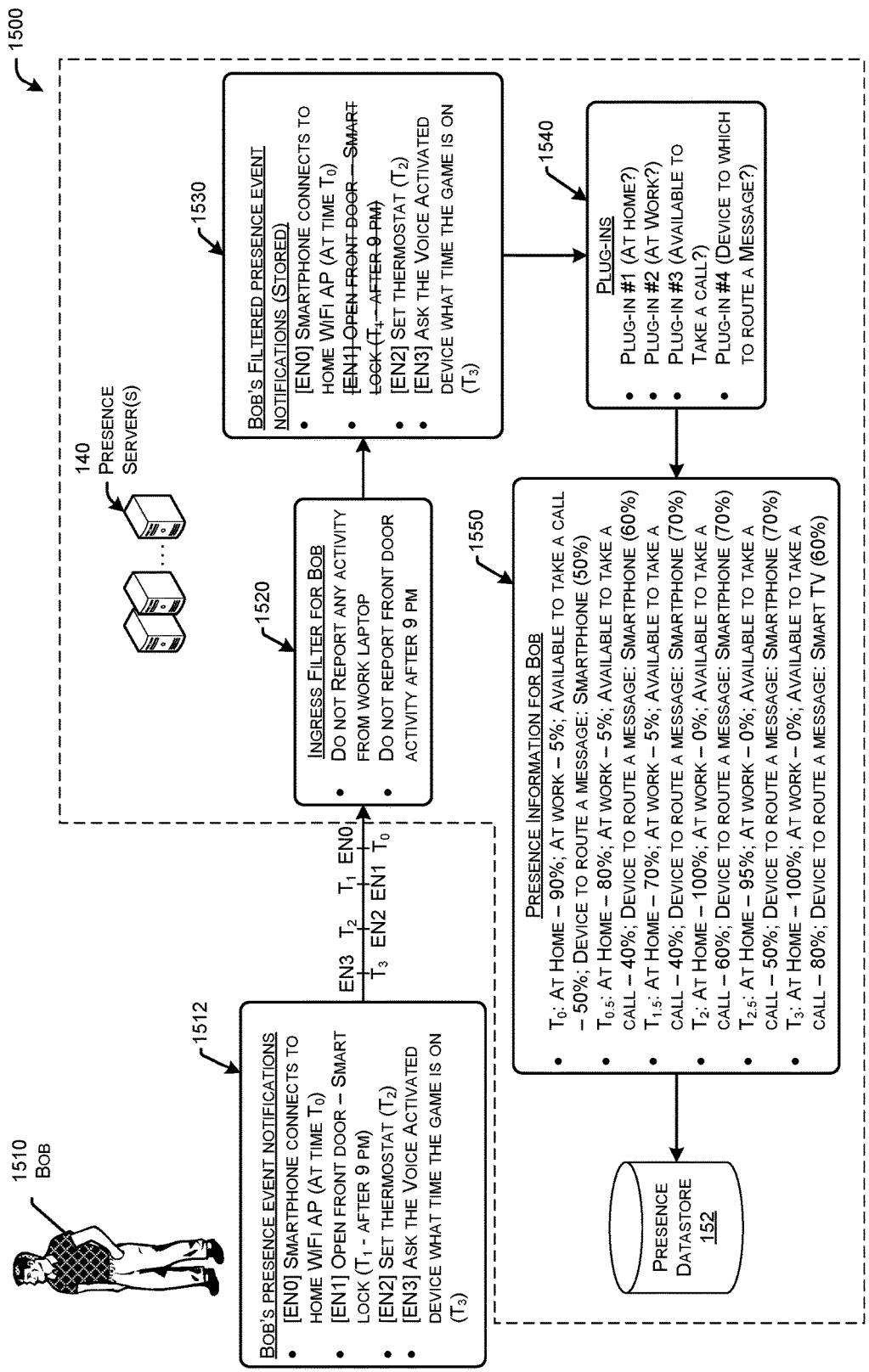
FIG. 15 illustrates a schematic diagram of an example environment where presence-event notifications are generated for a user, filtered, and then used to generate presence information.

FIG. 15 illustrates a schematic diagram of an example environment 1500 where presence-event notifications are generated for a user 1510, filtered, and then used to generate presence information 1550, in accordance with example embodiments of the disclosure. The user, Bob 1510, may have user devices that generate the presence-event notifications 1512 of EN0, EN1, EN2, and EN3. These presence-event notifications 1512 may be sent to the presence server(s) 140 at substantially the same time as they are generated. At the presence server(s) 140 the presence-event notifications 1512 may be applied to an ingress filter 1520 that is specific to Bob 1510. The ingress filter 1520 may specify presence events that may not be used for the purposes of generating presence information, and thus are to be filtered out and discarded prior to application to any presence plug-ins 1540. After ingress filtering, a filtered set of presence-event notifications 1530 may be generated. The filtered set of presence-event notifications may also be stored in the presence-event notification datastore 146. The pre-filtered presence-event notification of EN1 may be filtered out because the ingress filter 1520 does not allow the use of front door/smart lock-based presence events to be used after 9 PM. The filtered set of presence-event notifications 1530 may be applied to a set of plug-ins 1540. This may result in the generation of presence information 1550, where the presence information at times $T_0$, $T_2$, and $T_3$ are based on evaluation of the filtered presence-event notifications, and the presence information at times $T_{0.5}$, $T_{1.5}$, and $T_{2.5}$ are due to time-based decay. The presence information for Bob 1550 may be stored in presence datastore 152.

Figure 16:
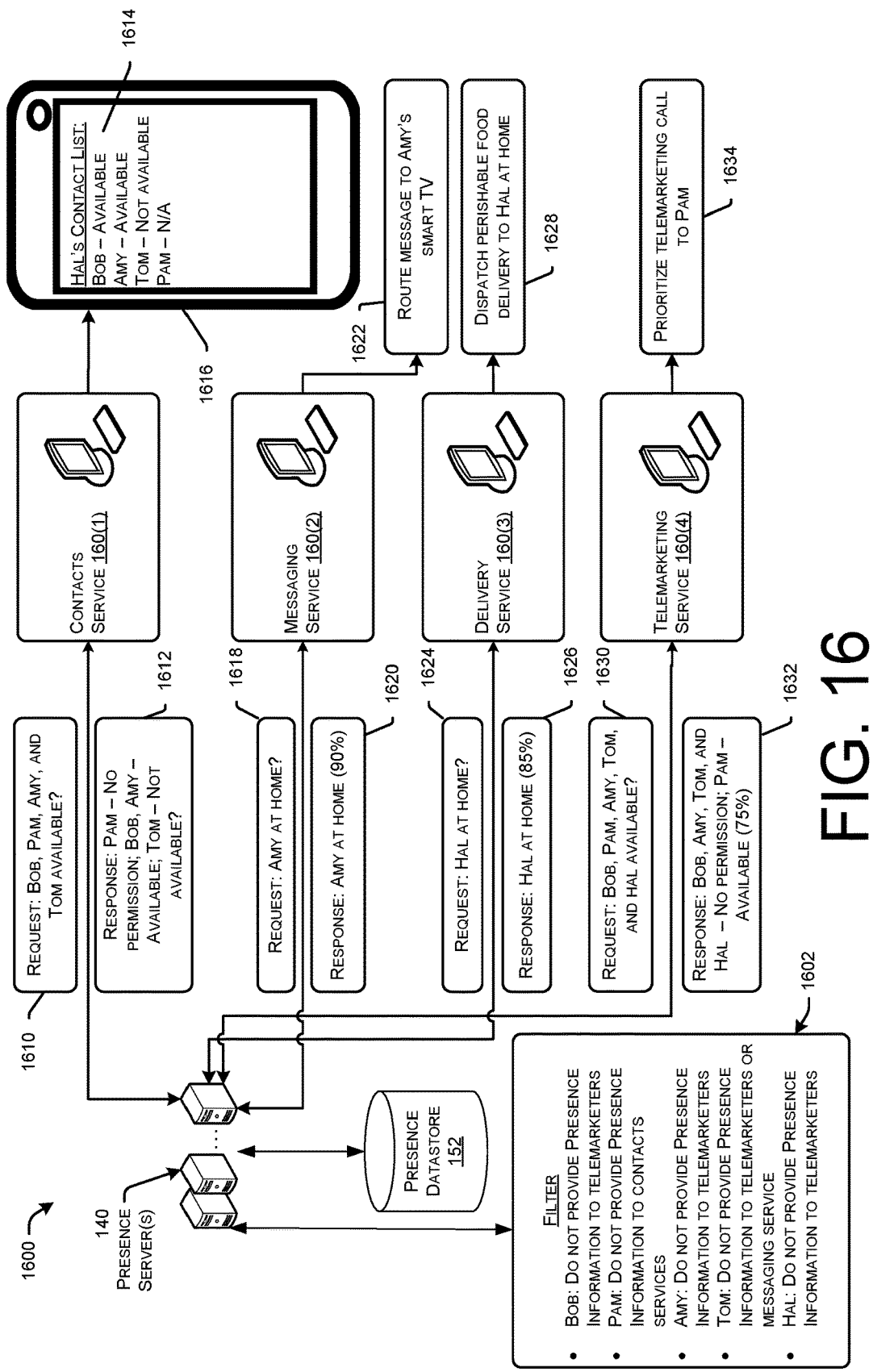
FIG. 16 illustrates a schematic diagram of an example environment where presence information is requested by a variety of services and used to provide services.

FIG. 16 illustrates a schematic diagram of an example environment 1600 where presence information 1612, 1620, 1626, 1632 is requested 1610, 1618, 1624, 1630 by a variety of service providers 160(1), 160(2), 160(3), 160(4) and used to provide services 1614, 1622, 1628, 1634, in accordance with example embodiments of the disclosure. Each of the service providers 160 may send a request for presence information 1610, 1618, 1624, 1630 and receive presence information 1612, 1620, 1626, 1632 in response to the requests 1610, 1618, 1624, 1630, respectively, based at least in part on a filter 1602 that specifies what information the service providers 160 are allowed to get for various users (e.g., Bob, Pam, Amy, Tom, and Hal) from the presence server(s) 140, as obtained for the presence datastore 152. Based at least in part on the presence information 1612 received, service provider 160(1) may be able to provide availability information for all the people on Hal's contacts 1614, except Pam, as displayed on Hal's smartphone 1616. Based at least in part on the presence information 1620 received, service provider 160(2) may route a message to Amy's Smart TV 1622. Based at least in part on the presence information 1626 received, service provider 160(3) may dispatch a delivery of perishable food to Hal at his home 1628. Based at least in part on the presence information 1632 received, service provider 160(4) may prioritize making telemarketing calls to Pam 1634.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
    one or more processors; and
    one or more non-transitory computer-readable media storing computer-executable instructions that, when executed by the one or more processors, cause the one or more processors to:
        receive presence-event notification data indicating an action performed by a user device associated with a user profile;
        generate first presence information associated with the user profile using the presence-event notification data, the first presence information indicating a first availability associated with a first service provider;

generate second presence information associated with the user profile using the presence-event notification data, the second presence information indicating a second availability associated with a second service provider;

store the first presence information associated with the user profile in a datastore;

store the second presence information associated with the user profile in the datastore;

receive a first request for the first presence information from the first service provider, the first service provider being authorized to receive the first presence information;

send, based at least in part on the first request, the first presence information to the first service provider;

receive a second request for the second presence information from a second service provider, the second service provider being authorized to receive the second presence information; and send, based at least in part on the second request, the second presence information to the second service provider.

2. The system of claim 1, wherein the first probability is based at least in part on at least one of: (i) a user being at a particular location; or (ii) the user being available to the first service provider to receive a first service provided by the first service provider.

3. The system of claim 1, wherein the one or more processors are further to:

determine, using a first set of egress filter parameters associated with the first service provider, that the first service provider is authorized to receive the first presence information; and determine, using a second set of egress filter parameters associated with the second service provider, that the second service provider is authorized to receive the second presence information.

4. The system of claim 1, wherein the one or more processors are further to:

receive historical presence-event notification data associated with the user profile;

generate, using the historical presence-event notification data, a first presence model;

generate, using the historical presence-event notification data, a second presence model;

apply the presence-event notification data to the first presence model to generate the first presence information; and apply the presence-event notification data to the second presence model to generate the second presence information.

5. The system of claim 1, wherein:

to generate the first presence information comprises generating the first presence information using the presence-event notification data and a first model associated with the first service provider;

to generate the second presence information comprises generating the second presence information using the presence-event notification data and a second model associated with the second service provider; and the second model is different than the first model.

6. A computer-implemented method, comprising: receiving, from a first service provider system, a first request for first presence information associated with a user profile, the request including a user identification associated with the user profile; receiving, based at least in part on the user identification and from a presence datastore, the first presence information, the first presence information indicating a first availability for receiving a first service associated with a first service provider, a first probability based at least in part on presence-event notification data; sending the first presence information to the first service provider system; receiving, from a second service provider system, a second request for second presence information associated with the user profile, the second request including the user identification associated with the user profile; receiving, based at least in part on the user identification and from the presence datastore, the second presence information, the second presence information indicating a second availability for receiving a second service associated with a second service provider, a second probability based at least in part on the presence-event notification data; and sending the second presence information to the second service provider system.

7. The computer-implemented method of claim 6, wherein the first probability is based at least in part on at least one of: (i) a user being at a particular location; or (ii) the user being available to receive the first service from the first service provider.

8. The computer-implemented method of claim 6, wherein the first availability indicates that a user is available to the first service provider associated with the first service provider system, and the second availability indicates that the user is unavailable to the second service provider associated with the second service provider system.

9. The computer-implemented method of claim 6, further comprising:

receiving, from a third service provider system, a third request for the first presence information; and determining, based at least in part on egress filter parameters associated with the third service provider system, that the third service provider system lacks authorization to receive the first presence information.

10. The computer-implemented method of claim 6, further comprising:

receiving historical presence-event notification data associated with the user profile;

generating a presence model is based at least in part on the historical presence-event notification data;

storing the presence model; and generating, using the presence model, the first presence information based at least in part on the presence-event notification data.

11. The computer-implemented method of claim 10, further comprising:

receiving feedback event notification data, the feedback event notification data indicating a third availability associated with the first presence information;

generating a second presence model based at least in part on the feedback event notification data;

deleting the presence model; and storing the second presence model.

12. The computer-implemented method of claim 6, further comprising:

receiving, from the first service provider system, a third request for the second presence information, the third request including the user identification associated with the user profile; and determining, based at least in part on user-specified egress filter parameters associated with the first service provider system, that the first service provider system lacks authorization to receive the second presence information.

13. The computer-implemented method of claim 6, further comprising:

receiving the presence-event notification data, the presence-event notification data indicating an action performed by a device;

generating, using a first model associated with the first service provider, the first presence information based at least in part on the presence-event notification data; and generating, using a second model associated with the second service provider, the second presence information based at least in part on the presence-event notification data.

14. A system, comprising: one or more processors; and one or more non-transitory computer-readable media storing computer-executable instructions that, when executed by the one or more processors, cause the one or more processors to perform operations comprising: receiving, from a first service provider system, a first request for first presence information associated with a user profile, the request including a user identification associated with the user profile; receiving, based at least in part on the user identification and from a presence datastore, the first presence information, the first presence information indicating a first availability for receiving a first service associated with a first service provider, a first probability based at least in part on presence-event notification data; sending the first presence information to the first service provider system; receiving, from a second service provider system, a second request for second presence information associated with the user profile, the second request including the user identification associated with the user profile; receiving, based at least in part on the user identification and from the presence datastore, the second presence information, the second presence information indicating a second availability for receiving a second service associated with a second service provider, a second probability based at least in part on the presence-event notification data; and sending the second presence information to the second service provider system.

15. The system of claim 14, wherein the first probability is based at least in part on at least one of: (i) a user being at a particular location; or (ii) the user being available to receive the first service from the first service provider.

16. The system of claim 14, wherein the first availability indicates that a user is available to the first service provider associated with the first service provider system, and the second availability indicates that the user is unavailable to the second service provider associated with the second service provider system.

17. The system of claim 14, the operations further comprising: receiving, from a third service provider system, a third request for the first presence information; and determining, based at least in part on egress filter parameters associated with the third service provider system, that the third service provider system lacks authorization to receive the first presence information.

18. The system of claim 14, the operations further comprising: receiving historical presence-event notification data associated with the user profile; generating a presence model is based at least in part on the historical presence-event notification data; storing the presence model; and generating, using the presence model, the first presence information based at least in part on the presence-event notification data.

19. The system of claim 18, the operations further comprising: receiving feedback event notification data, the feedback event notification data indicating a third availability associated with the first presence information; generating a second presence model based at least in part on the feedback event notification data; deleting the presence model; and storing the second presence model.

20. The system of claim 14, the operations further comprising: receiving, from the first service provider system, a third request for the second presence information, the third request including the user identification associated with the user profile; and determining, based at least in part on user-specified egress filter parameters associated with the first service provider system, that the first service provider system lacks authorization to receive the second presence information.

* * * * *